US008589821B1

(12) United States Patent
Bouchard et al.

(10) Patent No.: US 8,589,821 B1
(45) Date of Patent: Nov. 19, 2013

(54) STORYBOARD METHOD OF END-USER PROGRAMMING WITH NATURAL LANGUAGE CONFIRMATION

(75) Inventors: Ann M. Bouchard, Albuquerque, NM (US); Gordon C. Osbourn, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1742 days.

(21) Appl. No.: 11/845,297

(22) Filed: Aug. 27, 2007

(51) Int. Cl.
*G06F 3/14* (2006.01)

(52) U.S. Cl.
USPC ............. 715/838; 715/503; 714/38; 717/110; 719/318; 706/11; 706/45

(58) Field of Classification Search
USPC .................. 715/200–277, 716; 700/701–799, 700/800–866; 706/11, 45; 714/38; 719/318; 717/110
See application file for complete search history.

(56) References Cited

U.S. PATENT DOCUMENTS

| | | | |
|---|---|---|---|
| 6,957,415 | B1 | 10/2005 | Bouchard et al. |
| 7,565,663 | B2 * | 7/2009 | Knight et al. ............... 719/318 |
| 2006/0195411 | A1 * | 8/2006 | Knight et al. ............... 706/45 |
| 2006/0224946 | A1 * | 10/2006 | Barrett et al. ............... 715/503 |
| 2007/0174713 | A1 * | 7/2007 | Rossi et al. ............... 714/38 |
| 2008/0256005 | A1 * | 10/2008 | Van Doorn ............... 706/11 |
| 2008/0270982 | A1 * | 10/2008 | Cypher et al. ............... 717/110 |

OTHER PUBLICATIONS

Osbourn, Gordon C, et al,, "Dynamic Self-Assembly of Hierarchical Software Structures/ Systems", Sandia National Laboratories, Mar. 2003.
Bouchard, Ann M. et al., "Dynamic Self-Assembly and Computation: From Biological to information Systems", Sandia National Laboratories, Physical and Chemical Sciences Center, Jan. 2004.
Bouchard, Ann et al., "Dynamic Self-Assembly as Computation: An Unconventional Approach to Software Implementation", Sandia National Laboratories, Mar. 21, 2007.
U.S. Appl. No. 10/456,115.
U.S. Appl. No. 11/527,002.
U.S. Appl. No. 11/527,100.
U.S. Appl. No. 11/670,448.
U.S. Appl. No. 11/670,709.
U.S. Appl. No. 11/738,574.

* cited by examiner

*Primary Examiner* — Ruay Ho
(74) *Attorney, Agent, or Firm* — Cory G. Claassen; Carol I. Ashby

(57) ABSTRACT

A technique for end-user programming includes populating a template with graphically illustrated actions and then invoking a command to generate a screen element based on the template. The screen element is rendered within a computing environment and provides a mechanism for triggering execution of a sequence of user actions. The sequence of user actions is based at least in part on the graphically illustrated actions populated into the template.

27 Claims, 15 Drawing Sheets

Compare Accounts and Interest Rates

| Institution | Rating | Type | Min Open $ | Rate | CM | APY | Monthly Fee |
|---|---|---|---|---|---|---|---|
| Advanta Ban | ***** | Money Market | 2500 | 4.97 | D | 5.10 | 15 |
| Allstate Ba | *** | Savings | 100 | 4.16 | D | 4.25 | 4 |
| Allstate Ba | *** | Money Market | 1000 | 0.75 | D | 0.75 | 8 |
| AmTrust Dir | ** | Savings | 1000 | 5.23 | M | 5.36 | 0 |
| Appalachian | *** | Money Market | 10000 | 4.55 | D | 4.65 | 25 |
| Bank of Int | **** | Money Market | 1500 | 3.83 | D | 3.90 | 10 |
| BankDirect | **** | Savings | 100 | 1.49 | D | 1.50 | 0 |
| BANKFIRST | *** | Money Market | 15000 | 4.98 | M | 5.10 | 0 |
| BankUnited | *** | Savings | 5000 | 5.21 | D | 5.35 | 5 |
| Bay Fin Svn | ***** | Money Market | 2500 | 3.78 | D | 3.85 | 0 |
| California | ***** | Money Market | 5000 | 4.70 | M | 4.80 | 0 |
| Capital One | **** | Savings | | 4.88 | D | 5.00 | 0 |
| CorusBank | **** | Money Market | 100 | 4.88 | M | 4.99 | 25 |
| Countrywide | *** | Money Market | 1000 | 3.93 | D | 4.00 | 0 |
| Discover Ba | *** | Money Market | 2500 | 4.22 | D | 4.31 | 0 |
| Domestic Ba | ***** | Money Market | 2500 | 4.41 | M | 4.50 | 0 |
| E*TRADE Ba | *** | Savings | 1 | 4.93 | D | 5.05 | 0 |
| E-Loan | *** | Savings | 5000 | 5.12 | D | 5.25 | 0 |
| EmigrantDir | *** | Savings | 1 | 4.93 | D | 5.05 | 0 |
| EverBank | **** | Money Market | 1500 | 4.89 | D | 5.01 | 0 |
| FNBO Direct | **** | Savings | 1 | 5.13 | M | 5.25 | 0 |
| Geauga Savi | *** | Savings | 25000 | 5.45 | A | 5.45 | 0 |
| GMAC bank | ***** | Money Market | 500 | 4.97 | D | 5.10 | 0 |
| grandyield | **** | Savings | 2500 | 5.14 | D | 5.27 | 0 |
| HSBC Direct | *** | Savings | 1 | 4.94 | M | 5.05 | 0 |
| iGObanking | *** | Savings | | 5.16 | D | 5.30 | 0 |
| ING DIRECT | *** | Savings | 1 | 4.41 | M | 4.50 | 0 |

FIG. 3

STORYBOARD METHOD OF END-USER PROGRAMMING WITH NATURAL LANGUAGE CONFIRMATION

This invention was made with Government support under Contract No. DE-AC04-94AL85000 between Sandia Corporation and the U.S. Department of Energy. The U.S. Government has certain rights in this invention.

TECHNICAL FIELD

This disclosure relates generally to software, and in particular but not exclusively, relates to a technique for end-user programming.

BACKGROUND INFORMATION

Many hierarchical software systems are designed level-by-level using object-oriented designs that define the classes of objects of an application and their interrelationships. Associated with each class is a set of operations that can be performed on its objects, plus the set of object attributes. In the object-oriented design approach, code and data that belong together can be combined into objects. The objects are interconnected with each other within a level and to other levels. The objects are treated essentially as black-box modules that are utilized in various configurations to perform higher-level functions. The object-oriented designs can be used to form complex domains with layers or modules that can be interchangeable. Software architecture systems of enormous complexity can thus be formed. However, like most software systems, the object modules are actuated by direct calls from other modules and perform only designated and non-changeable functions. Data pathways between objects are predefined at compile time and immutable thereafter, unless the source code is modified and recompiled. A high-level of skill and product knowledge is required to program even the simplest of changes to the underlying source code. Once the source code is modified, it must still be recompiled and executed before the modification is realized in the runtime software.

Due to the rigid nature of conventional object-oriented programming ("OOP"), the users of software products created using conventional OOP techniques cannot easily modify the underlying software and data pathways. Rather, if a group of users all have a common need, they often must lobby the publisher for their desired feature, and wait for the next software product installment before a new feature addressing the need is incorporated by the publisher.

Microsoft Windows Operating System ("OS"), Microsoft Office, Apple OS, and Linux OS are examples of computing environments that are fixed at compile time and relatively immutable by the user at runtime. Microsoft Windows OS and Apple OS both use graphical user interfaces ("GUIs") that are fixed at compile time and therefore generally immutable by the user (notwithstanding user defined configuration selections).

Although both these software products rely extensively on GUIs, they still require a relatively tech-savvy user who understands hierarchical file structures to access, modify, create, and delete user files and data. For users that are unfamiliar with hierarchical file structures, using these software packages can be frustrating and intimidating. On the other hand, for advanced tech-savvy users, the inability to modify these software packages after compile time can also be frustrating.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 is a diagram illustrating an example table comparing accounts and interest rates, in accordance with an embodiment of the invention.

DETAILED DESCRIPTION

Embodiments of a system and method for implementing an end-user programming technique within a computing environment at runtime are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
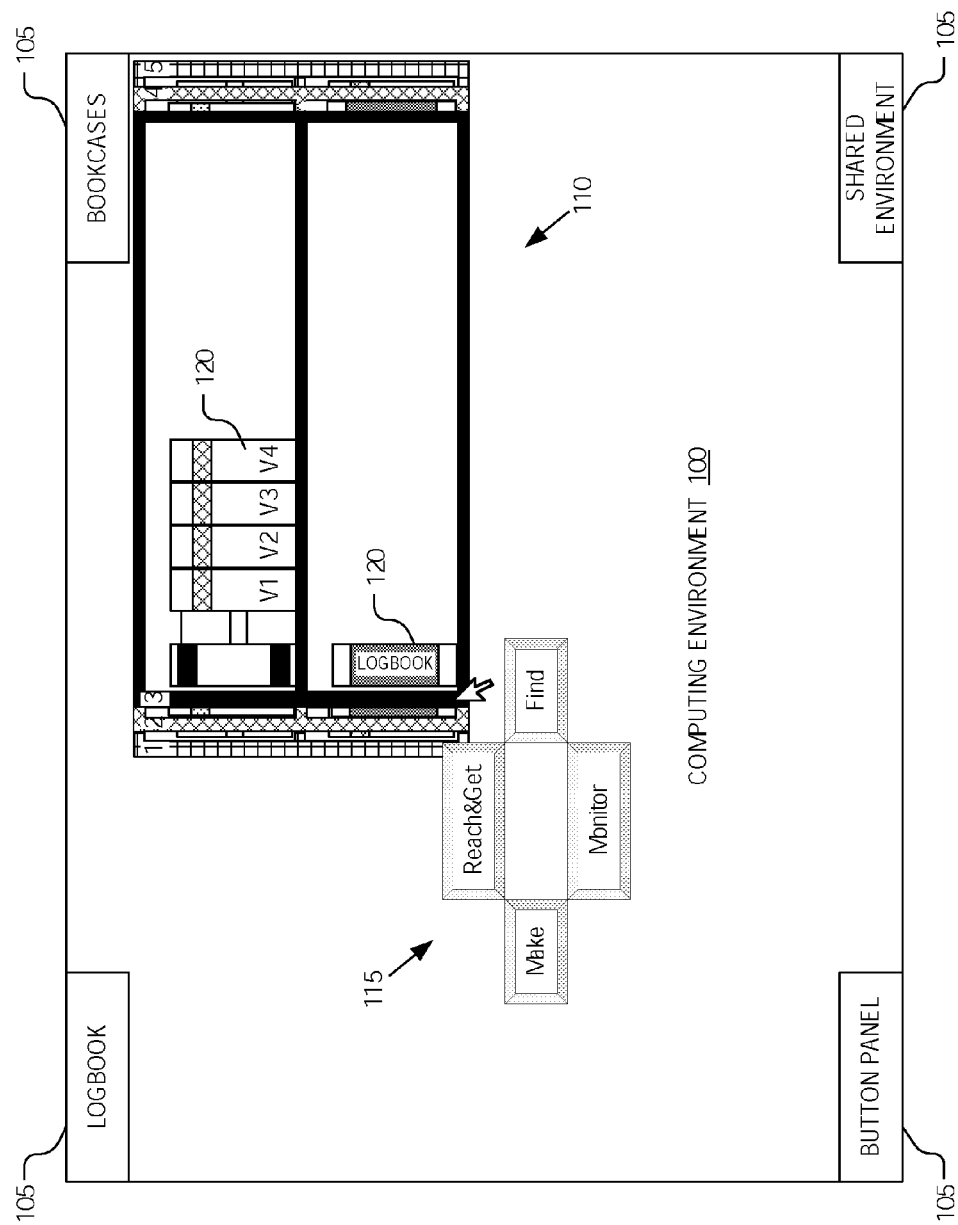
FIG. 1 is a diagram illustrating a display screen of a computing environment, in accordance with an embodiment of the invention.

FIG. 1 is a diagram illustrating a display screen of a computing environment 100, in accordance with an embodiment of the invention. The illustrated embodiment of computing environment 100 includes access elements 105, a virtual bookcase 110, and a popup compass menu 115.

Figure 11:
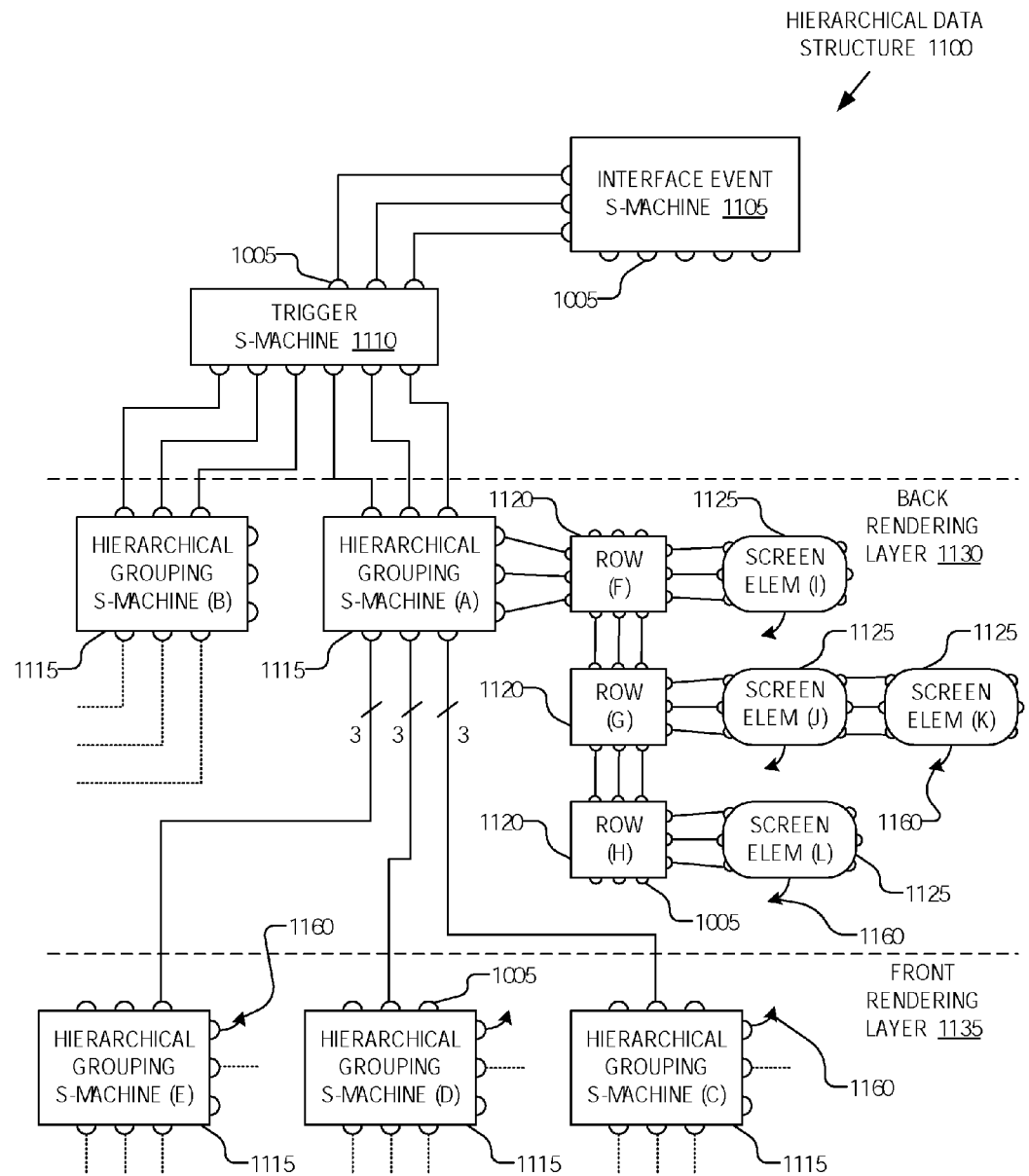
FIG. 11 is a block diagram illustrating a hierarchical data structure for controlling and rendering images to a display screen, in accordance with an embodiment of the invention.

Access elements 105 are a type of screen element rendered to provide visual access to associated functions. The bookcase access element accesses one or more virtual bookcases 110 having bookshelves holding virtual books 120 for creating, storing, accessing, and modifying data. The logbook access element accesses a logbook enabling a user to view a record or history of past events. The button panel access element accesses function-specific buttons (e.g., a calculator). The shared environment access element accesses a shared environment, which enables a variety of users to remotely collaborate. In one embodiment, computing environment 100 is rendered using a hierarchical data structure similar to hierarchical data structure 1100 discussed below (FIG. 11).

Virtual bookcase 110 provides a mechanism for storing, organizing, and retrieving virtual books 120, in accordance with an embodiment of the invention. Virtual bookcase 110 intuitively organizes virtual books 120 in a manner easily usable by less tech-savvy individuals who are not comfortable with hierarchical file structures (e.g., Windows Explorer or DOS based directory systems). Data, text, and/or images are accessible by opening one of virtual books 120. Virtual books 120 are stored in bookcases 110 and identified by their physical location within a particular bookcase 110 (i.e., bookshelf and position on bookshelf) and the visual distinctiveness of virtual books 120 themselves. A particular virtual book 120 may be opened by clicking on the spine or binding of the particular virtual book 120. Again, virtual bookcase 110 and virtual books 120 may be rendered within computing environment 100 using a hierarchical data structure similar to hierarchical data structure 1100 discussed below (FIG. 11).

During operation, a user may access a number of functions by right clicking a cursor on a particular screen element within computing environment 100. Depending upon the particular screen element, the right click event may cause a compass menu (e.g., compass menu 115) to popup proximate to the cursor. The compass menus may be context sensitive and therefore include different menu items dependent upon the screen element on which the user clicked. For example, if the user clicks on a bookshelf within virtual bookcase 110, compass menu 115 may popup. The illustrated embodiment of compass menu 115 includes a Reach&Get button, a Find button, a Monitor button, and a Make button. While the specific functionality implemented by these buttons is not pertinent for the present discussion, these buttons can be context sensitive and even user defined.

Embodiments of the present invention enable an end-user to program and design screen elements, such as software buttons, sliders, check boxes, textures, or any visual screen element, to execute a sequence of user actions. The programmable software buttons may be embedded at a variety of different locations within computing environment 100. For example, software buttons may be embedded within compass menus, virtual books 120, applications, button panels, windows, template fields, or otherwise.

In one embodiment, screen elements can be designed and programmed by end-users using a storyboard technique with natural language confirmation. The storyboard technique enables the end-user to copy graphically illustrated actions from a virtual repository of such graphically illustrated actions into a template. The graphically illustrated actions may represent generic user actions (e.g., copy, paste, adjust gamma exposure on an image, reduce image size by half, etc.) or may represent actions previously executed by the end-user. For example, the end-user may regularly repeat a sequence of actions on a particular data type on a daily or weekly basis and may desire to automate the sequence. Embodiments of the invention enable the end-user to program a screen element (e.g., software button, slider, check box, a texture, or otherwise) to automatically execute the sequence of actions upon invocation. Furthermore, since screen elements are programmed using a storyboard technique with natural language confirmation, any end-user who is unskilled in computer programming languages can create, use, and modify the underlying software or source code of computing environment 100 during runtime without having to recompile the source code.

Figure 2:
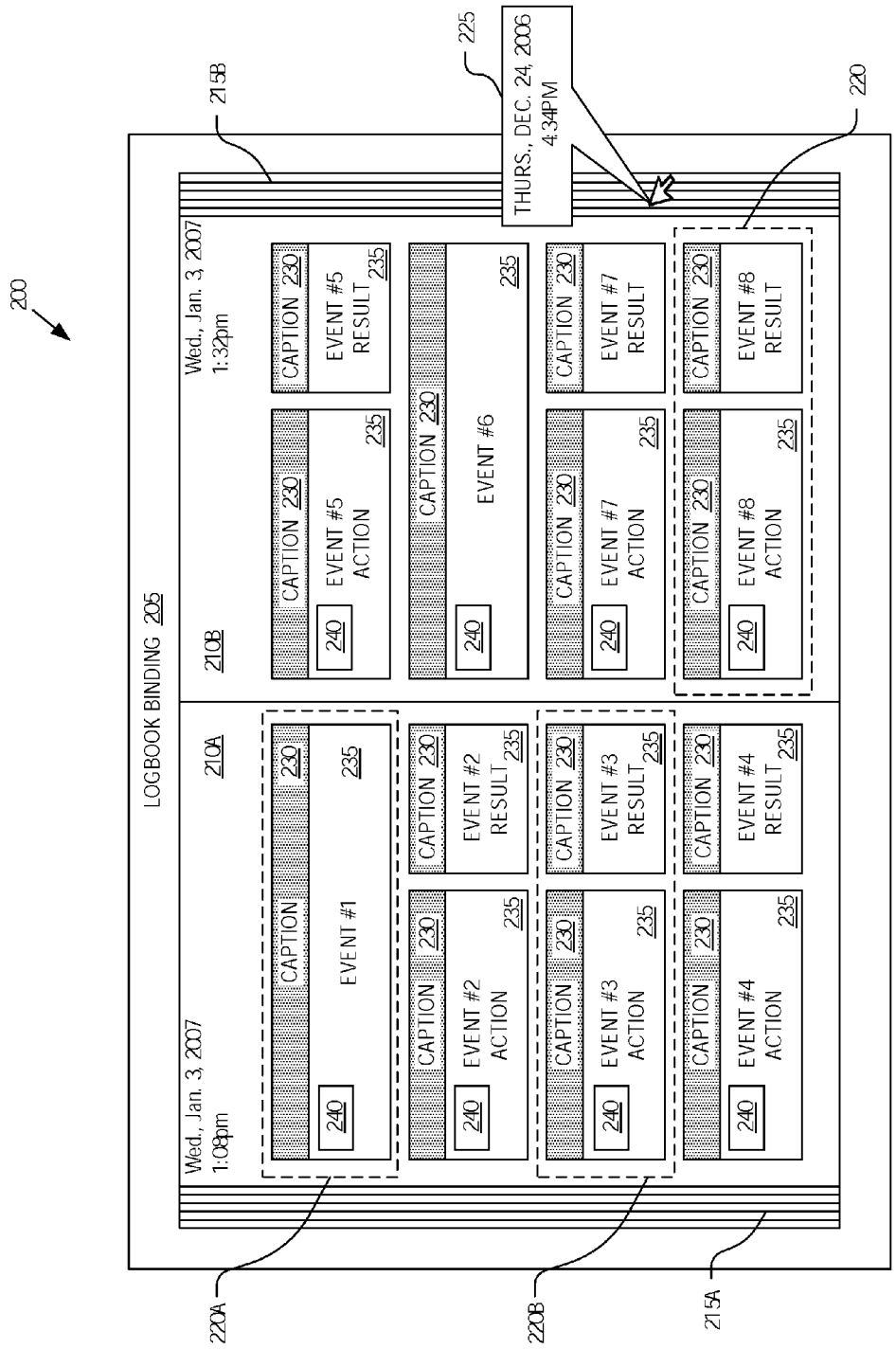
FIG. 2 is a block diagram illustrating a repository of graphically illustrated actions, in accordance with an embodiment of the invention.

In one embodiment, the virtual repository from which the graphically illustrated actions are copied is a virtual logbook that logs user actions in real-time and displays past user actions as a graphically illustrated history. FIG. 2 is a block diagram illustrating a virtual logbook 200, in accordance with an embodiment of the invention. In one embodiment, virtual logbook 200 is for logging, displaying, searching, and/or manipulating a history of past events occurring within computing environment 100. Although logbook 200 is discussed in relation to computing environment 100, it should be appreciated that logbook 200 may be used to log events in any number of computing environments, such as Microsoft Windows™, Linux™, Mac OS X™, or otherwise.

The illustrated embodiment of logbook 200 includes a logbook binding 205, pages 210 (including pages 210A and 210B), page edge regions 215A and 215B (collectively 215). As events transpire within computing environment 100, pages 210 of logbook 200 are written with log entries 220 (including log entries 220A and 220B; only a portion are labeled) describing these events to generate a history of past events. Events may occur anywhere within computing environment 100 and even across multiple different applications and documents. The events may transpire in response to user actions/inputs (e.g., mouse click, key stroke, scroll wheel action, cursor navigation action, or otherwise) or other activity (e.g., network event) and are logged in real-time.

In one embodiment, each log entry 220 includes a thumbnail caption 230 and an event display region 235. Thumbnail captions 230 textually describe the event associated with the particular log entry 220, while event display regions 235 graphically illustrate the associated event. For some event types, the corresponding log entry 220 (e.g., log entry 220A) is made up of a single panel, with a single thumbnail caption 230 and a single event display region 235. For other event types, the corresponding log entry 220 (e.g., log entry 220B) is separated into two panels, each with its own caption 230 and event display region 235. In the example of log entry 220B, the left event display region 235 illustrates an action associated with the corresponding event and the right event display region 235 illustrates a result of the corresponding event resulting from the action illustrated on the left.

As discussed above, virtual logbook 200 may capture a variety of different types of events. Some example event types may include a text edit event, a text insertion event, a text deletion event, a book access event, an image edit event, a web browsing event, an email event, an email creation event, or otherwise. In fact, event types may include generic application event types associated with each different application installed on computing environment 100 and specific application event types associated with specific actions a user may accomplish within a given application. Accordingly, an event may be categorized under multiple event types including generic application event types and specific application event types. For example, all events related to a book may be categorized as a generic book event type, while specific events that may occur in relation to a book may also be categorized as a specific book event type, such as an edit event, a text insertion event, a text deletion event, an image edit event, and so on. In one embodiment, some or all event types are assigned a unique icon or thumbnail 240 representative of the event type. The icons/thumbnails enable a user to quickly scan logbook 200 to visually find a particular past event.

As log entries 220 fill up multiple pages of virtual logbook 200, a user can peruse the history of past events by flipping pages in logbook 200. The user may flip forward in time through logbook 200 by mouse clicking on page edge region 215B, or alternatively, flip backward in time through logbook 200 by mouse clicking on page edge region 215A. In one embodiment, as the user positions a cursor over one of page edge regions 215, a popup caption 225 (e.g., hover text) may appear to indicate the date and time of the first log entry 220 that will be flipped to should the user "click" the mouse.

As discussed above, virtual logbook 200 may operate as a repository of graphically illustrated actions from which an end-user may copy the graphically illustrated actions into a template to build a storyboard of a sequence of actions. The template may then be used to generate a screen element (e.g., software button) which, when clicked, triggered, or otherwise invoked, will repeat the sequence of actions.

Figure 4:
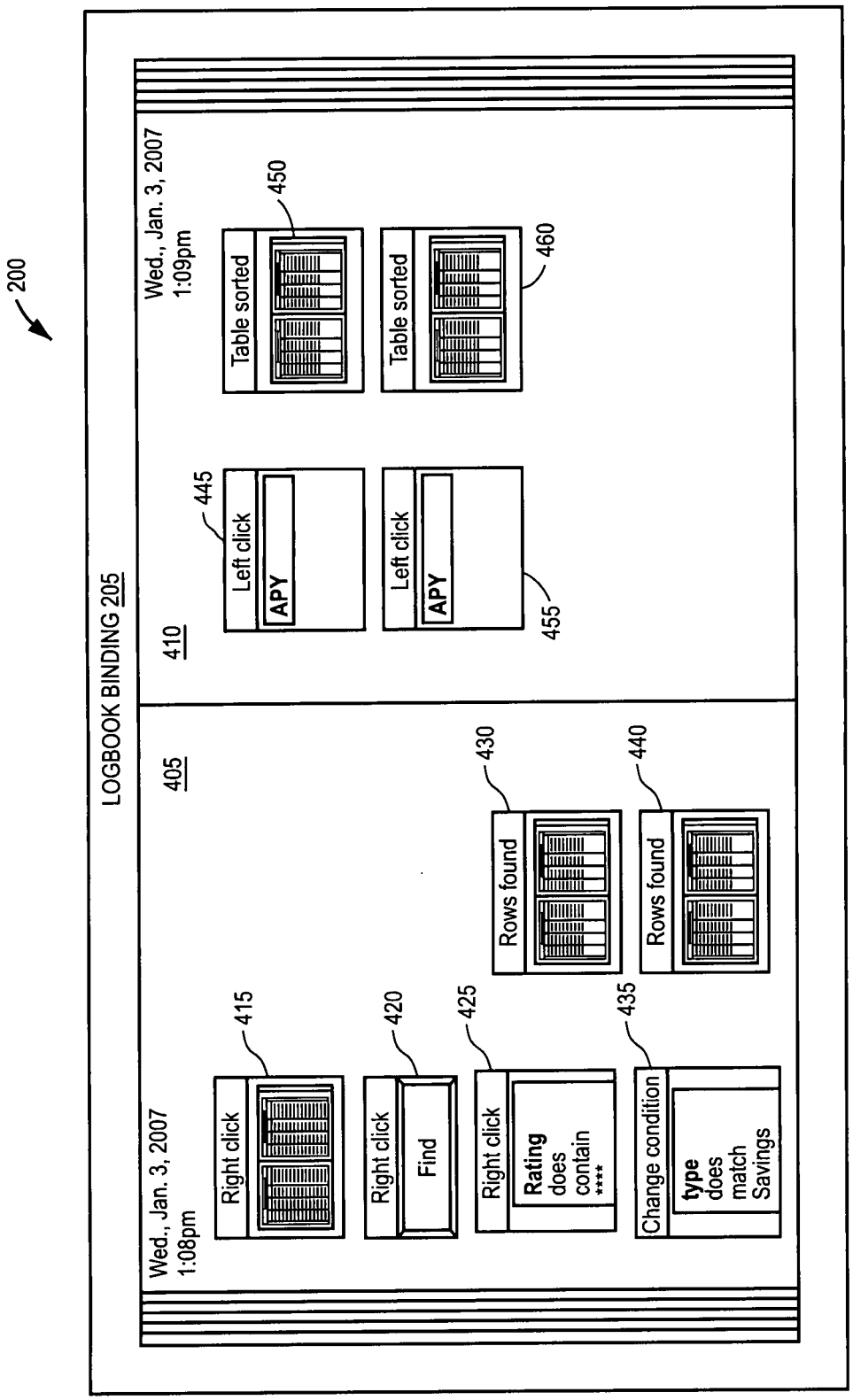
FIG. 4 is a diagram illustrating an example repository for graphically logging user actions while manipulating a chart, in accordance with an embodiment of the invention.

FIGS. 3 and 4 illustrate a specific example of a sequence of actions that an end-user may wish to repeat on a daily basis. Referring to FIG. 3, this example illustrates the actions an end-user may execute to find 4-star accounts, sorted by APY, using a table 300 entitled, "Compare Accounts and Interest Rates." Table 300 is modeled after a table that may be found on a popular Internet banking website. Table 300 lists the highest-yielding accounts in the country along with pertinent information about each account. FIG. 4 illustrates virtual logbook 200 opened to two example pages 405 and 410 that graphically illustrate the actions the end-user executed on table 300 to find all 4-star accounts, sorted by APY.

Referring to page 405, the end-user selected the Compare Accounts and Interest Rates table and right clicked to access a compass menu (thumbnail 415). Within the compass menu, the end-user selected the Find function with a left click (thumbnail 420) and set the specific condition (e.g., rating does contain 4-stars) upon which to search (thumbnail 425). In response to the Find function, table 300 was filtered to display only 4-star rated accounts and the filtered results were displayed (thumbnail 430). Subsequently, the end-user added the additional condition of "type does match savings accounts" to the Find function (thumbnail 435) and the filtered results were again displayed (thumbnail 440).

Referring to page 410, the end-user selected the APY column of the filtered table 300 with a left click (thumbnail 445), which caused the filtered table 300 to be sorted according to APY in ascending order and displayed (thumbnail 450). The end-user again left clicked on the APY column to sort table 300 according to APY in descending order (thumbnail 455) and the results displayed (thumbnail 460). Accordingly, pages 405 and 410 graphically illustrate the actions executed by the end-user to find all 4-star savings accounts sorted in descending order according to APY in a storyboard format.

Figure 5:
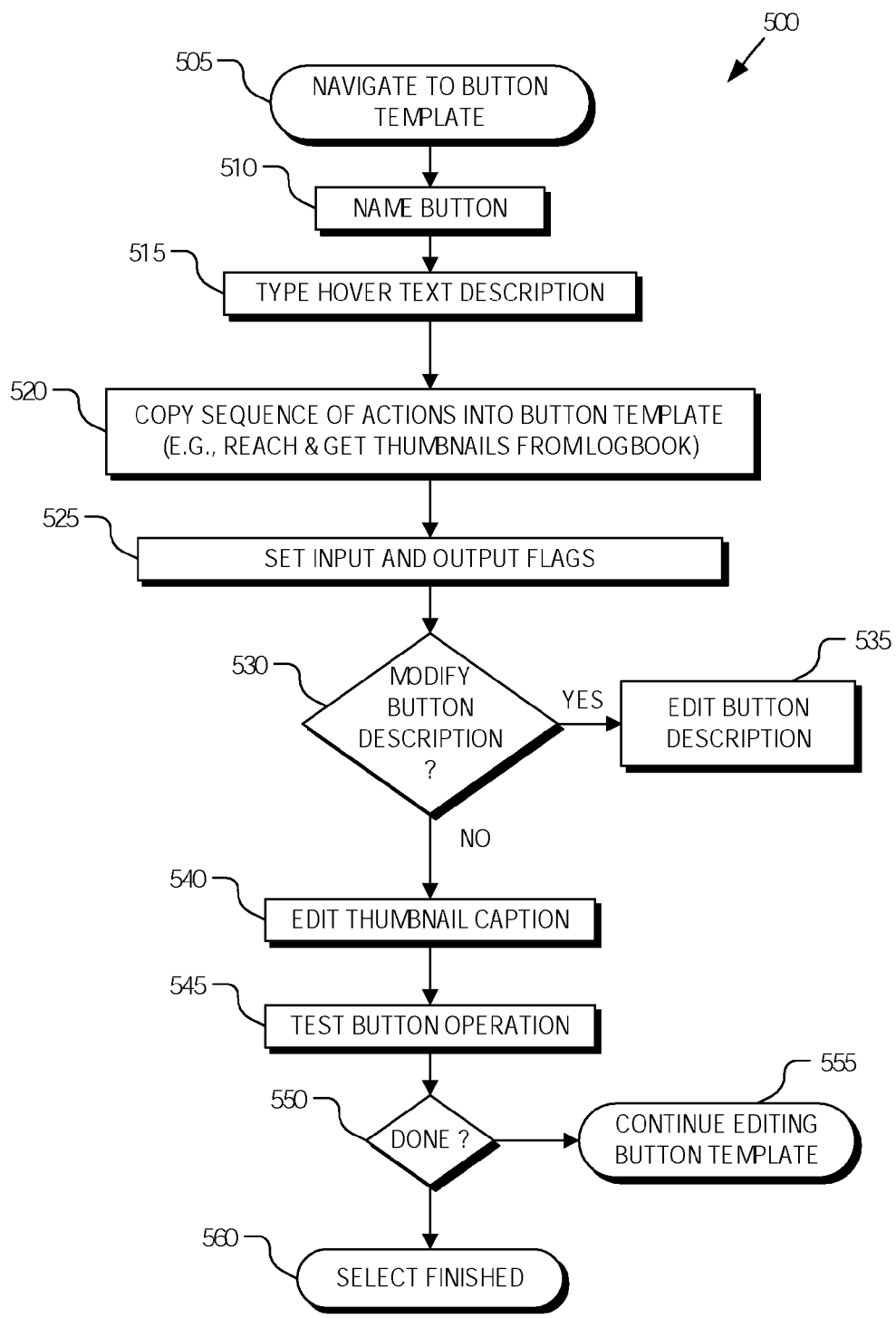
FIG. 5 is a flow chart illustrating a process for programming a screen element to execute a sequence of user actions by copying graphically illustrated actions into a template, in accordance with an embodiment of the invention.

FIG. 5 is a flow chart illustrating a process 500 for programming a screen element to execute a sequence of user actions using a storyboard technique with natural language confirmation, in accordance with an embodiment of the invention. The order in which some or all of the process blocks appear in process 500 should not be deemed limiting. Rather, one of ordinary skill in the art having the benefit of the present disclosure will understand that some of the process blocks may be executed in a variety of orders not illustrated.

Although process 500 describes a technique using a button template for designing a software button, it should be appreciated that process 500 may be used to design a variety of different types of screen elements. Process 500, illustrated in FIG. 5, is described below with reference to FIGS. 6-9 using the example sequence of actions depicted in FIG. 4. In other words, process 500 is described using the example of programming a software button to find 4-star banking accounts, sorted by APY. However, it should be appreciated that process 500 may be followed to create buttons for executing a variety of user actions.

Figure 6:
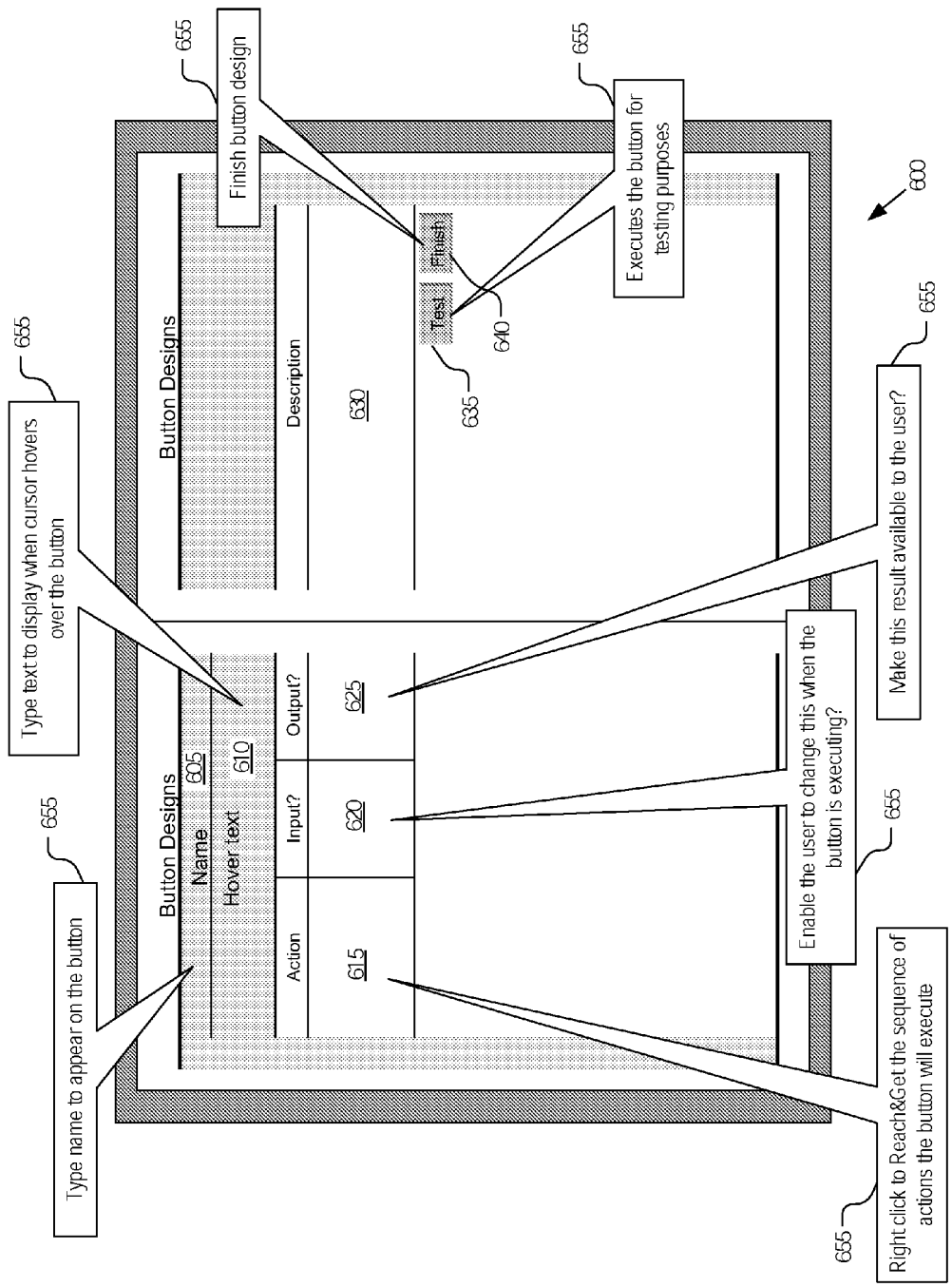
FIG. 6 illustrates a programming template for programming a screen element to execute a sequence of user actions, in accordance with an embodiment of the invention.

In a process block 505, the end-user navigates to a button template to commence designing a new button. The button template may be accessed via a compass menu (e.g., compass menu 115), a virtual book 120 on bookcase 110, an access element 105 (e.g., the button panel access element), or otherwise. FIG. 6 illustrates a button template 600, in accordance with an embodiment of the invention. The illustrated embodiment of button template 600 includes a name field 605, a hover text field 610, actions fields 615, input flag fields 620, output flag fields 625, action description fields 630, a test button 635, a finish button 640, a button description field 645 (see FIG. 9), a thumbnail caption field 650 (see FIG. 9), and template hover text 655 associated with the various fields as illustrated.

Figure 7:
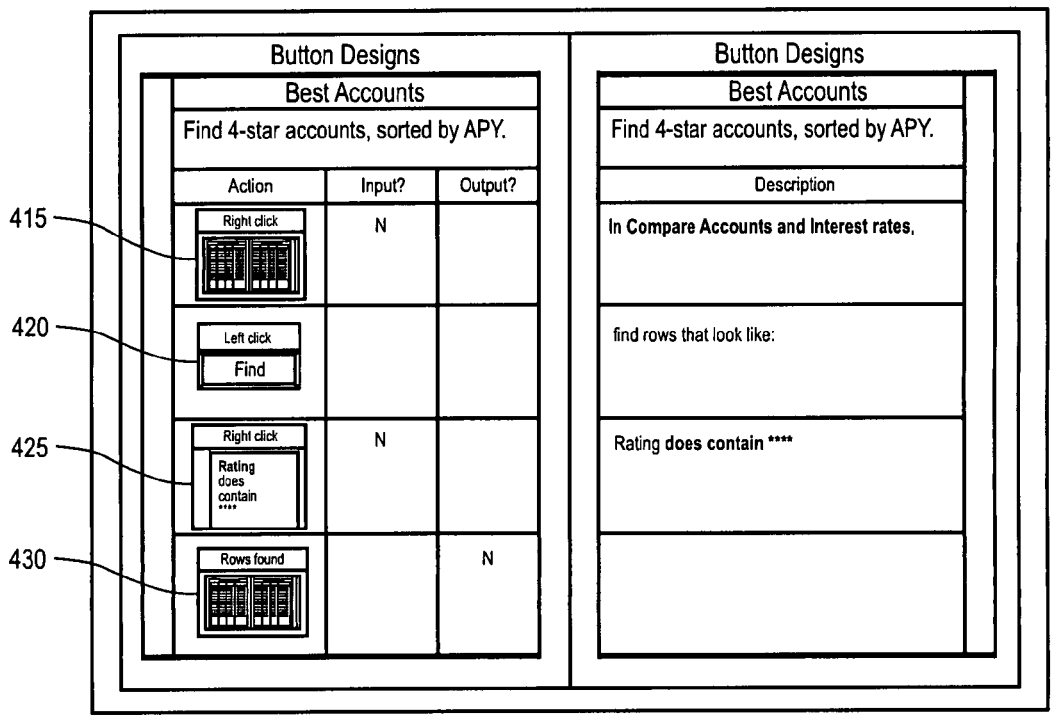
FIG. 7 illustrates a first portion of a programming template populated with graphically illustrated actions, in accordance with an embodiment of the invention.

In a process block 510, the end-user edits name field 605 to type a name that will appear on the software button. Referring to FIG. 7, "Best Accounts" was typed. In a process block 515, the end-user edits hover text field 610 to type hover text that will appear when a user positions the cursor over the software button. Typically, the hover text will be a short informative phrase that describes the overall function executed by the software button. Referring to FIG. 7, "Find 4-star accounts, sorted by APY" was typed.

Figure 8:
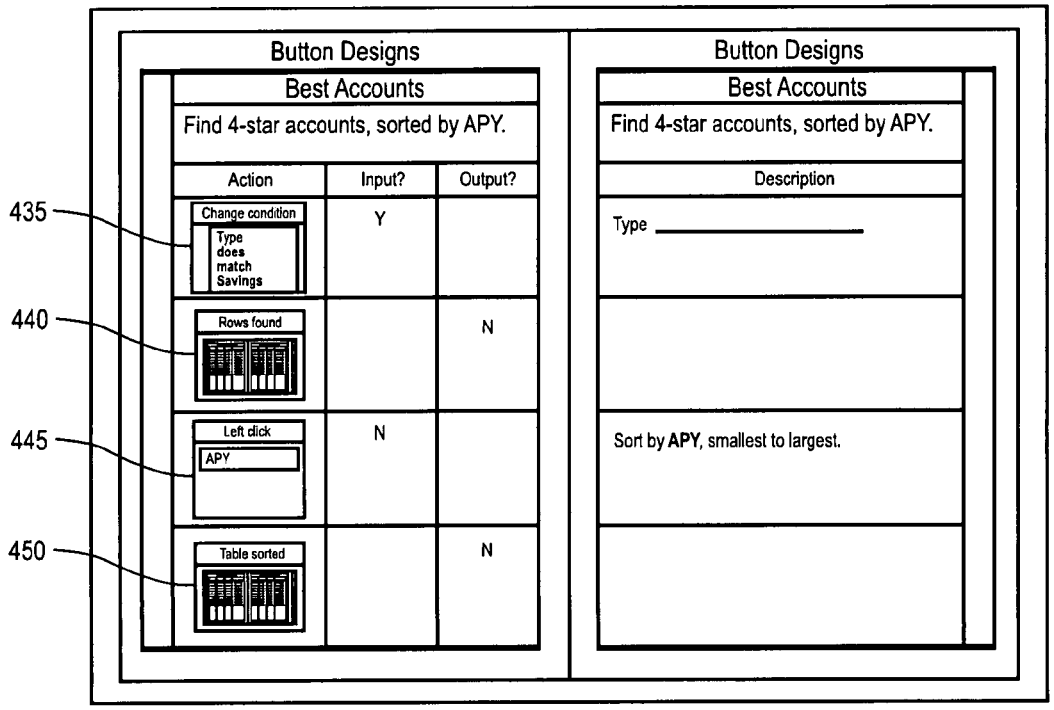
FIG. 8 illustrates a second portion of a programming template populated with graphically illustrated actions, in accordance with an embodiment of the invention.
Figure 9:
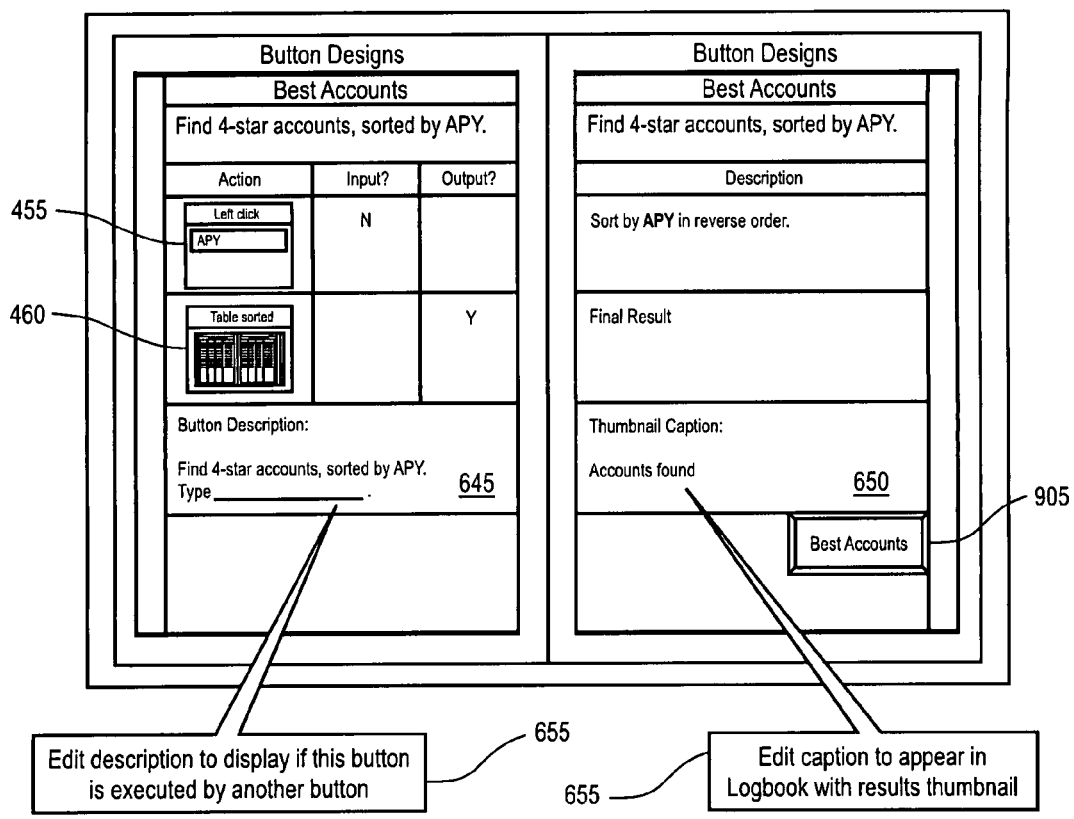
FIG. 9 illustrates a third portion of a programming template populated with graphically illustrated actions, in accordance with an embodiment of the invention.

In a process block 520, the end-user programs the button to perform a sequence of actions by copying graphical representations of the actions into button template 600. FIGS. 7, 8, and 9 illustrate the ten thumbnails 415-460 from FIG. 4 each copied into a row under the action column of button template 600. These graphically illustrated actions can be copied into button template 600 using a variety of different techniques including a simple copy and paste, cut and paste, drag and drop, reach and get, or otherwise populated into button template 600 from virtual logbook 200. In one embodiment, the reach and get option is invoked by a right click on the empty action field 615 and the selection of the reach function from a popup compass menu. Once the reach function is invoked, the user navigates or reaches to virtual logbook 200, selects thumbnails 415-460, and then invokes the get function. In response, the get function automatically copies thumbnails 415-460 into the action column of button template 600 with each thumbnail populated into its own row, and returns the cursor to button template 600.

It should be appreciated that the end-user may copy graphical representations of user actions not just from virtual logbook 200, but from any number of virtual repositories of graphically illustrated actions. For example, a number of category specific virtual repositories may store themed related actions (e.g., a graphics repository for storing image filter actions). Furthermore, the graphical representations of the actions can include thumbnail representations (e.g., thumbnails 415-460), icons, or other graphically descriptive representations of user actions that may be ordered within template 600 to represent a sequence of user actions in a storyboard-like manner.

In one embodiment, the graphically illustrated actions can be categorized into two types: input actions and output actions. The input actions correspond to user input actions that will be simulated or automated when the finished button is invoked, while the output actions correspond to output results generated (or output results executed) in response to the input actions. For example, thumbnails 415, 420, 425, 435, 445, and 455 correspond to input actions, while thumbnails 430, 440, 450, and 460 correspond to output actions.

In connection with copying graphically illustrated actions into button template 600, textual descriptions of the associated actions are automatically populated into corresponding action description fields 630. The textual descriptions operate as a sort of natural language confirmation. The action descriptions read in sequence like a natural sentence describing the programmed sequence of user actions.

Further in connection with copying the graphically illustrated actions into button template 600, '?' symbols are automatically populated into input flag fields 620 for input actions and into output flag fields 625 for output actions. In a process block 525, the end-user sets each of the flags to "yes" or "no." In the case of input flag fields 620, setting the input flag to "no" signifies that the corresponding input action is fixed at the time of designing the button and immutable at execution time. Setting the input flag to "yes" signifies that the corresponding input action is dynamic and the user will be prompted to make a selection at the time of execution or invocation of the button.

For example, referring to thumbnail 435 (FIG. 8), the corresponding input flag field 620 has been set to "yes" or 'Y' indicating that the end-user will be prompted to select the account type for searching. Referring to table 300, the end-user was originally given the option of searching for type "savings" or type "money market." Setting the input flag to "yes" will result in presenting this choice to the user at execution time. The runtime choice is illustrated in the corresponding action description field 630 as a highlighted underline. Referring to thumbnail 425 of FIG. 7, the corresponding input flag field 620 is set to "no" or 'N' and therefore the software button will only filter a table for accounts with a 4-star rating. This fixed choice is illustrated in the corresponding action description filed 630 with the highlighted phrase "does contain ****."

In the case of output flag fields 625, setting the output flag to "no" signifies that the corresponding output action or intermediate result will not be displayed or made available to the end-user. Setting the output flag to "yes" signifies that the corresponding output action or intermediate result will be displayed or made available to the end-user at the time of execution or invocation of the software button.

Returning to process 500, in a decision block 530, the end-user can choose to edit button description field 645 (see FIG. 9). The text of button description field 645 is for display in the action description field of another button template, if the current button is copied into the other template as a constituent action. Accordingly, embodiments of the invention enable end-users to build up complex "super-buttons" based in part on previously created buttons. In one embodiment, button description field 645 defaults to the combination of the hover text typed into hover text field 610 plus the action description of any input actions having an input flag set to "yes." The end-user can choose to customize the button description (process block 535) or keep the default.

The thumbnail caption field 650 represents the text that will appear on the thumbnail image associated with the software button. The thumbnail image may be logged into virtual logbook 200 upon invocation of the software button or may be copied into another button template for creating a super-button. In one embodiment, thumbnail caption field 650 defaults to the thumbnail caption of the final result. In the example of FIG. 9, this would be the caption on thumbnail 460, "Table sorted." In a process block 540, thumbnail caption field 650 may be edited by the end-user. In the example of FIG. 9, thumbnail caption field 650 has been changed to "Accounts found."

Once all the fields of button template 600 have been populated, in a process block 545, the end user can test the operation of the software button by clicking test button 635 (FIG. 6). In response, the software button will run through the sequence of actions populated into button template 600. If the end-user is unsatisfied with operation of the button or realizes that additional changes need to be made (decision block 550), then the end-user can continue editing button template 600 (process block 555). Otherwise, the end-user can select finish button 640 (process block 560), which will result in the creation of the software button 905 (e.g., "Best Accounts" button). Upon selecting finish button 640 (FIG. 6), test button 635 and finish button 640 are replaced with the software button 905 (FIG. 9).

Although not illustrated, button template 600 may also include an image field for selecting the thumbnail image associated with the software button. In one embodiment, the end-user can simply copy an image into the image field to create the association. Alternatively, the thumbnail image may be selected from among the thumbnail images copied into action fields 615.

Accordingly, to design a new software button, the end-user simply copies graphically illustrated actions into action fields 615 and edits the other various textual fields. As illustrated, the fields of button template 600 include template hover text 655 to guide the end-user through the programming process. The graphically illustrated actions copied into button template 600 are copied in a storyboard-like manner and provide an intuitive and simple mechanism to program underlying source code to execute new functions during runtime by the end-user. In addition to the intuitive nature of the storyboard method, textual descriptions of the actions are displayed along side the actions to provide a natural language confirmation to the end-user.

Figure 10:
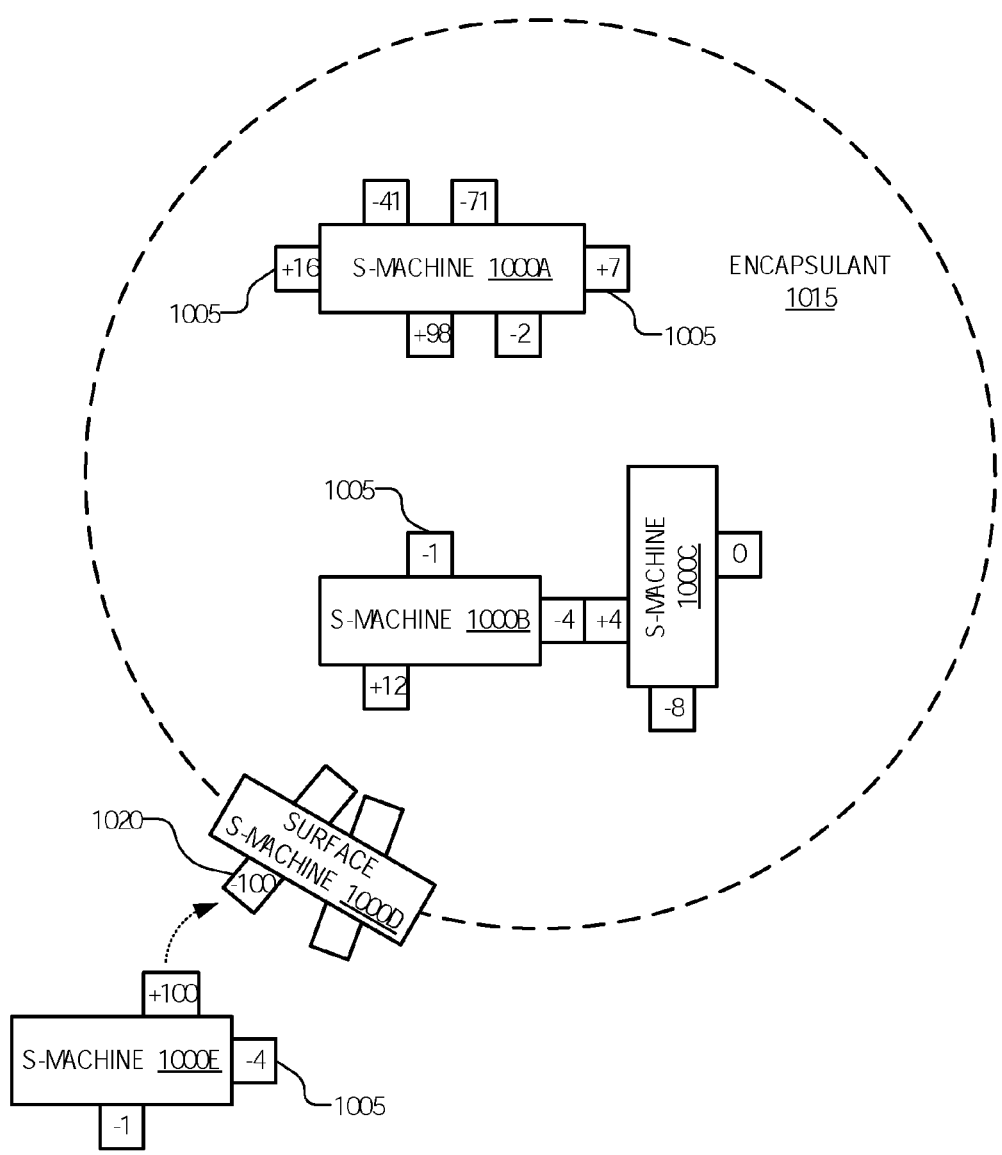
FIG. 10 is a block diagram illustrating self-organizing software-machines ("s-machines") grouped in an encapsulated environment, in accordance with an embodiment of the invention.

FIG. 10 is a block diagram illustrating a demonstrative software virtual environment that may be used to implement underlying software architectures of embodiments of the invention. The illustrated software virtual environment includes software entities termed "software-machines" or "s-machines" 1000A-1000E (collectively s-machines 1000). Each s-machine 1000 is capable of executing a function, which can be simple (such as adding two numbers) or complex (such as reading a complex formatted file from the hard disk). Each s-machine 1000 includes one or more of a data storage element to store data, an actuating element to execute commands, or a control element to control activation of the s-machine in response to a stimulus.

S-machines 1000 are capable of self-assembling or self-organizing by binding or linking to each other to form a larger s-machine complex capable of executing higher level complex tasks. For example, multiple s-machines 1000 may be created, one capable of summing two operands, one capable of subtracting one operand from another, one capable of multiplying two operands, and yet another capable of dividing one operand into another operand. The s-machines capable of implementing these simple mathematical functions may then bind together with one or more other s-machines capable of generating a graphical user interface ("GUI"). By self-organizing into a more complex structure, these simple s-machines can create a graphical calculator. Since self-organizing is executed during runtime, additional s-machines capable of other mathematical functions can be created and joined with the existing s-machines of the calculator group to extend the functionality of the calculator during runtime, after compile time. In this manner, s-machines 1000 are capable of generating a real-time, user-adaptable, computing environment.

S-machines 1000 self-assemble using binding sites 1005 (only a portion are labeled so as not to clutter the drawing). Each s-machine 1000 may include one or more binding sites 1005 that can remain concealed pending the occurrence of prerequisite conditions, at which time the concealed binding site exposes itself to other s-machines 1000. In some cases, the act of binding itself is the prerequisite or stimulus for exposing another concealed binding site. Each binding site 1005 is associated with a key and can stochastically or deterministically bind to another exposed binding site on a different s-machine 1000 having a complementary key or other key pair association framework. S-machines 1000 make and break bonds formed between complementary binding sites 1005 in due course during runtime. In one embodiment, when binding sites of two s-machines 1000 are linked, the two sites have pointers pointing to each other. This provides a data pathway between the two s-machines, enabling the s-machines to access each other's data, pass data to each other, or send commands to each other. These bonds may be short-lived or long-lived. The act of binding/unbinding (also referred to linking/unlinking or coupling/decoupling) may be the stimulus to cause one or more internal actuation elements of an s-machine 1000 to execute. A signal (whether data-passing or not) sent from one s-machine to a bound s-machine may also be the stimulus to cause internal actuation elements of one or both s-machines 1000 to execute. In other cases, other stimulus may cause an s-machine 1000 to execute its actuation element(s).

S-machines 1000 can self-organize into hierarchical data structures having limited scope. For example, surface s-machine 1000D may function as an interface to encapsulant 1015 to limit the scope of s-machines 1000A-1000C contained within encapsulant 1015. Encapsulant 1015 acts as a sort of virtual environment of limited scope where s-machines 1000 within this virtual environment form some application, function, or process.

Surface s-machine 1000D can operate as a sort of gate keeper allowing s-machines to enter or exit encapsulant 1015. In this role, surface s-machine 1000D has a key associated with a binding site 1020 and any s-machine 1000 wishing to pass through the virtual encapsulant surface must have a complementary key. Alternatively, surface s-machine 1000D can operate as a signal transducer across the encapsulant surface. In that role, when an external s-machine having a complementary key binds to binding site 1020, this stimulates surface s-machine 1000D to expose a site internal to the encapsulant, which can trigger the execution of some internal task by binding to a control site of an internal s-machine. Encapsulant 1015 effectively creates a local environment in which collections of free binding sites 1005 can interact without interference from the outside world. S-machines 1000 encapsulated within encapsulant 1015 can reuse binding keys already in use by other s-machines outside of encapsulant 1015 without establishing bonds thereto. It should be appreciated that encapsulant 1015 is not necessarily intended to connote a literal barrier formed around the internal s-machines 1000A, 1000B, 1000C, but rather a functional barrier that computationally isolates the internal s-machines 1000A, 1000B, and 1000C in some manner from external s-machine 1000E.

In one embodiment, the virtual environment created by s-machines 1000 and encapsulant 1015 is a biologically inspired software architecture. S-machines 1000 are analogous to proteins, which operate as molecular machines. S-machines 1000 self-assemble via binding/unbinding events in a dynamic manner similar to continually reconfiguring proteins. As mentioned, the bonds between s-machines 1000 can be long lived, analogous to strong covalent bonds, or fleeting, analogous to weak protein-protein bonds. Encapsulant 1015 resembles a biological cell membrane that isolates its internal contents from bonding interactions with external structures. Surface s-machine 1000D, itself, is analogous to membrane proteins in biological cells. Some surface s-machines, termed "gates", correspond to channel proteins, allowing passage of other entities (s-machines or encapsulants) into or out of the encapsulant. Other surface s-machines may correspond to signal or receptor proteins capable of communicating signals without transporting any s-machines into or out of an encapsulant.

FIG. 11 is a block diagram illustrating a hierarchical data structure 1100 including s-machines for rendering and interacting with screen elements, in accordance with an embodiment of the invention. The illustrated embodiment of hierarchical data structure 1100 includes an interface event s-machine 1105, a trigger s-machine 1110, hierarchical grouping s-machines 1115, row rendering s-machines 1120, and screen element s-machines 1125. The s-machines dynamically self-organize into hierarchical data structure 1100 by matching complementary binding keys associated with their binding sites 1005 (only a portion are labeled), as discussed above.

Figure 12:
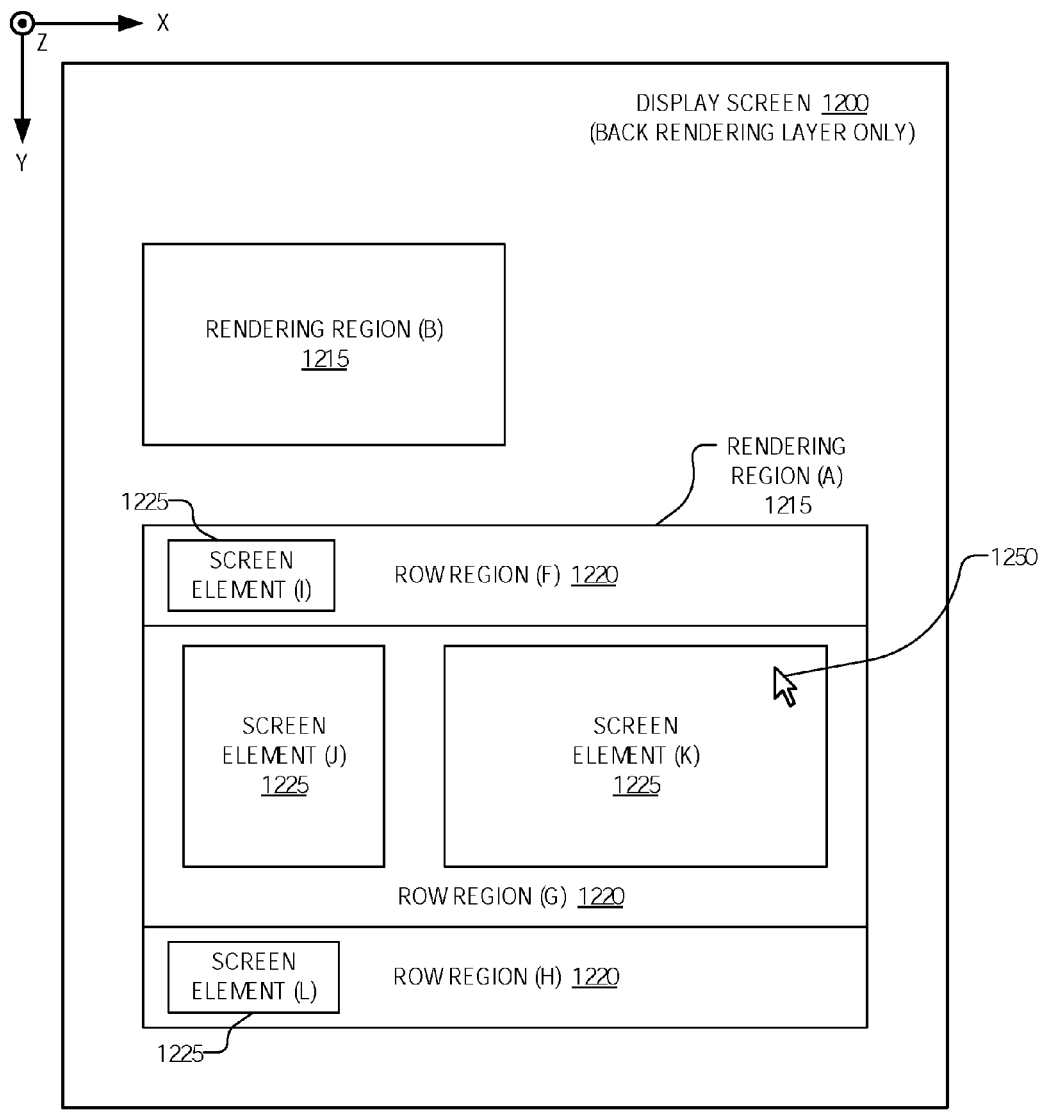
FIG. 12 is a block diagram illustrating a display screen with multiple rendering regions, row regions, and screen elements, in accordance with an embodiment of the invention.

FIG. 12 illustrates an example display screen 1200 including screen elements rendered by hierarchical data structure 1100. FIG. 12 only illustrates a single rendering layer, corresponding to a back rendering layer, while multiple front rendering layers (not illustrated) may be rendered directly in front of, and therefore partially conceal, the back rendering layer.

Each hierarchical grouping s-machine 1115 is associated with a corresponding rendering region 1215 (e.g., hierarchical grouping s-machine (A)→rendering region (A), hierarchical grouping s-machine (B)→rendering region (B), etc.). Each row rendering s-machine 1120 is associated with a corresponding row region 1220 (e.g., row rendering s-machine (F)→row region (F), row rendering s-machine (G)→row region (G), etc.). Similarly, each screen element s-machine 1125 is associated with a corresponding screen element 1225 (e.g., screen element s-machine (J)→screen element (J), screen element s-machine (L)→screen element (L), etc.).

Hierarchical grouping s-machines 1115, row rendering s-machines 1120, and screen element s-machines 1125 are organized into a hierarchy where vertically bound hierarchical grouping s-machines 1115 connote successive rendering layers. Since hierarchical grouping s-machines (A) and (B) are both bound within hierarchical data structure 1100 at the same rendering layer (i.e., back rendering layer 1130), they group row rendering s-machines 1120 and screen element s-machines 1125 responsible for rendering screen elements 1225 on the same rendering layer. In contrast, hierarchical grouping s-machines (C), (D), and (E) are bound below hierarchical grouping s-machine (A), and therefore group row rendering s-machines and screen element s-machines responsible for rendering screen elements at a front rendering layer 1135 that is in front of or overlays back rendering layer 1130 (i.e., front rendering layer 1135 has a greater value in the z-axis than back rendering layer 1130, see FIG. 12). Furthermore, since hierarchical grouping s-machines (C), (D), and (E) are all bound below hierarchical grouping s-machine (A), these s-machines will correspond to rendering regions that have the same or smaller x-y dimensions as rendering region (A) of hierarchical grouping s-machine (A), but will be bounded by the x-y coordinates of rendering region (A), and therefore reside in front of at least a portion of rendering region (A).

In one embodiment, screen element s-machines 1125 include data or pointers to data for generating each screen element 1225 rendered to display screen 1200. For example, screen element s-machines 1125 may provide the data used to render an image, text, blank region, or any other object to display screen 1200.

One or more screen element s-machines 1125 may link in series from a single row rendering s-machine 1120. In one embodiment, row rendering s-machines 1120 include functionality for rendering each screen element 1225 included within its associated row region 1220 to display screen 1200 with reference to data provided by the corresponding screen element s-machine 1125. It should be appreciated that in other embodiments, the functionality for rendering screen elements 1225 may be embedded within screen element s-machines 1125 themselves or hierarchical grouping s-machines 1115.

In one embodiment, interface event s-machine 1105 includes functionality for tracking the movement of a pointing cursor 1250 (see FIG. 12) and may include knowledge of the x-y coordinates of cursor 1250, the relative motion of cursor 1250 from one spot on display screen 1200 to another, the velocity of cursor 1250, or otherwise. Interface event s-machine 1105 may further poll external input/output ("I/O") devices (e.g., key board, mouse, etc.) for events associated with the current location of cursor 1250 (e.g., key strokes, scroll wheel movement, mouse clicks, etc.).

Trigger s-machine 1110 is bound between interface event s-machine 1105 and hierarchical grouping s-machines at the back rendering layer (e.g., hierarchical grouping s-machines (A) and (B) at back rendering layer 1130). In one embodiment, trigger s-machine 1110 receives the current x-y coordinates of cursor 1250 and sends a signal with the x-y coordinates to the hierarchical grouping s-machines (A) and (B). Hierarchical grouping s-machines (A) and (B) determine whether cursor 1250 currently resides over any portion of their corresponding rendering region 1215. If it does, hierarchical grouping s-machines 1115 will pass this signal on to successive hierarchical grouping s-machines bound below. In FIG. 11, if hierarchical grouping s-machine (A) determined that the cursor 1250 resides over its rendering region, it would pass the x-y coordinate signal to hierarchical grouping s-machines (C), (D), and (E). The lowest hierarchical grouping s-machine in the hierarchy (corresponding to the front-most rendering layer) that determines that the cursor 1250 resides over its rendering region will also forward the x-y coordinate signal on to its attached row rendering s-machines 1120 and screen element s-machines 1125 to determine over which screen element 1225 cursor 1250 currently resides. When a particular screen element s-machine 1125 determines that cursor 1250 currently resides over its corresponding screen element 1225, the particular screen element s-machine 1125 becomes the "owner" of the cursor 1250. The screen element s-machine 1125 that owns the cursor 1250 will expose new binding sites 105 to establish new event pathways (discussed in greater detail below in connection with FIGS. 13 and 14). It should be appreciated that in other embodiments, the functionality for determining which screen element s-machine 1125 owns the cursor 1250 may be embedded within the row rendering s-machines 1120 or the hierarchical grouping s-machines 1115.

Trigger s-machine 1110 may further be capable of issuing render signals to the lower hierarchy of hierarchical data structure 1100 to signal each s-machine to re-execute its rendering instructions (e.g., OpenGL commands, DirectX commands, or the like). Trigger s-machine 1110 may further be capable of signaling the lower hierarchy that display screen 1200 has changed (e.g., user dragged a screen element to a new screen location) and that each s-machine should update itself and render accordingly. Although FIG. 11 illustrates three bonds between each s-machine within hierarchical data structure 1100 (one for each of the rendering, screen pointer x-y coordinate, and update signals) it should be appreciated that more or less such bonds may be established between the s-machines.

The illustrated embodiment of hierarchical data structure 1100 further illustrates links 1160 for establishing communication pathways between screen element s-machines 1125 and hierarchical grouping s-machines 1115. For example, a particular screen element s-machine 1125 may establish a link 1160 with one or more hierarchical grouping s-machines 1115 that correspond to rendering regions 1215 that reside directly in front of, at the next rendering layer forward, the corresponding screen element 1225 of the particular screen element s-machine 1125. Links 1160 enable the back rendering layer screen element s-machines 1125 to signal the bound-to hierarchical grouping s-machines 1115 (which render the next rendering layer forward) to detach from hierarchical data structure 1100. Upper rendering layer hierarchical grouping s-machines 1115 may detach from hierarchical data structure 1100 so that other hierarchical grouping s-machines 1115 can attach to change the image rendered to display screen 1200.

Figure 13:
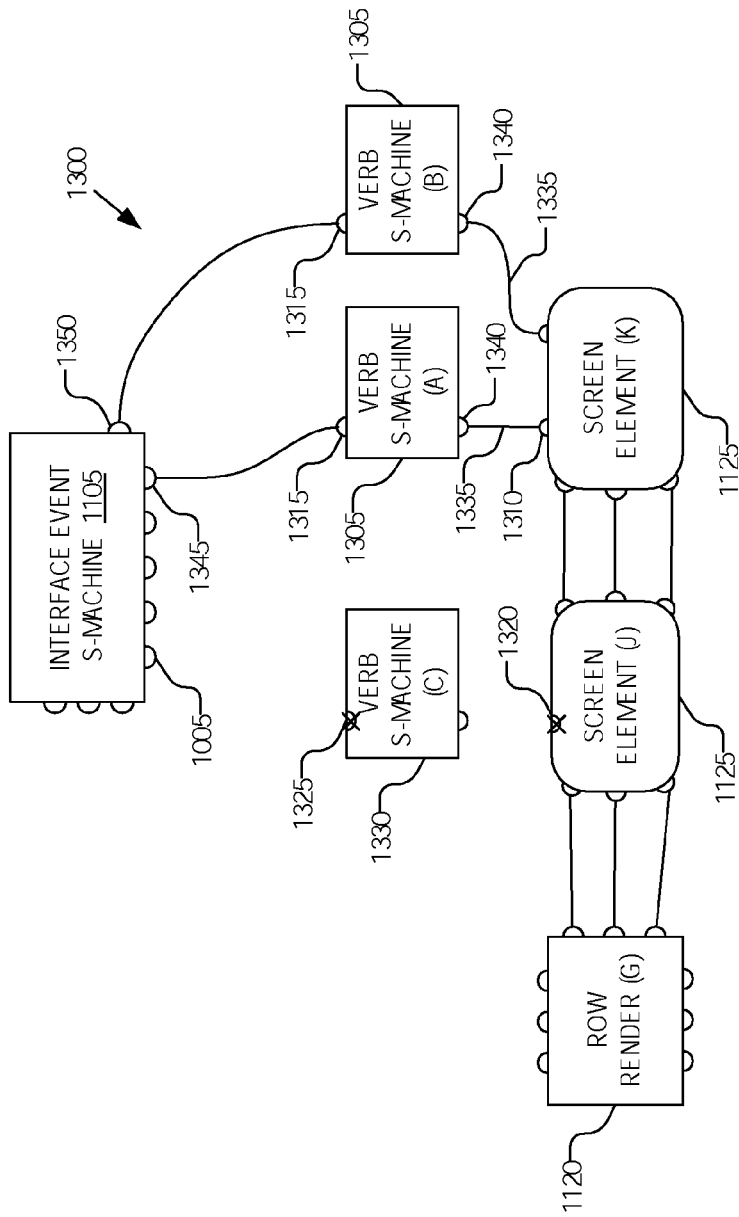
FIG. 13 is a block diagram illustrating self-assembly of an event pathway between an interface event s-machine, a verb s-machine, and a screen element s-machine, in accordance with an embodiment of the invention.

FIG. 13 is a block diagram illustrating self-assembly of an event pathway 1300, in accordance with an embodiment of the invention. Event pathway 1300 links interface event s-machine 1105 to screen element (K) via a verb s-machine 1305. Event pathway 1300 is created in real-time in response to a specific event or set of events. Verb s-machine 1305 is a special type of s-machine 1000 that binds to other s-machines 1000 to implement functions and take "actions" associated with the bound-to s-machine 1000. In the present example, verb s-machines bind to screen element s-machines 1125 to execute actions associated with their corresponding screen elements 1225.

For example, event pathway 1300 may be created in response to passing cursor 1250 over screen element (K). For the sake of discussion, if screen element (K) is a text area rendered to display screen 1200, then positioning cursor 1250 over screen element (K) and left "clicking" a mouse button may insert a cursor within the text, putting the text area into edit mode. Additionally, positioning cursor 1250 over screen element (K) and then pressing the left mouse button down and dragging may select and highlight text. The functionality of initiating text editing and selecting text may be implemented by verb s-machines 1305, as described below.

Figure 14:
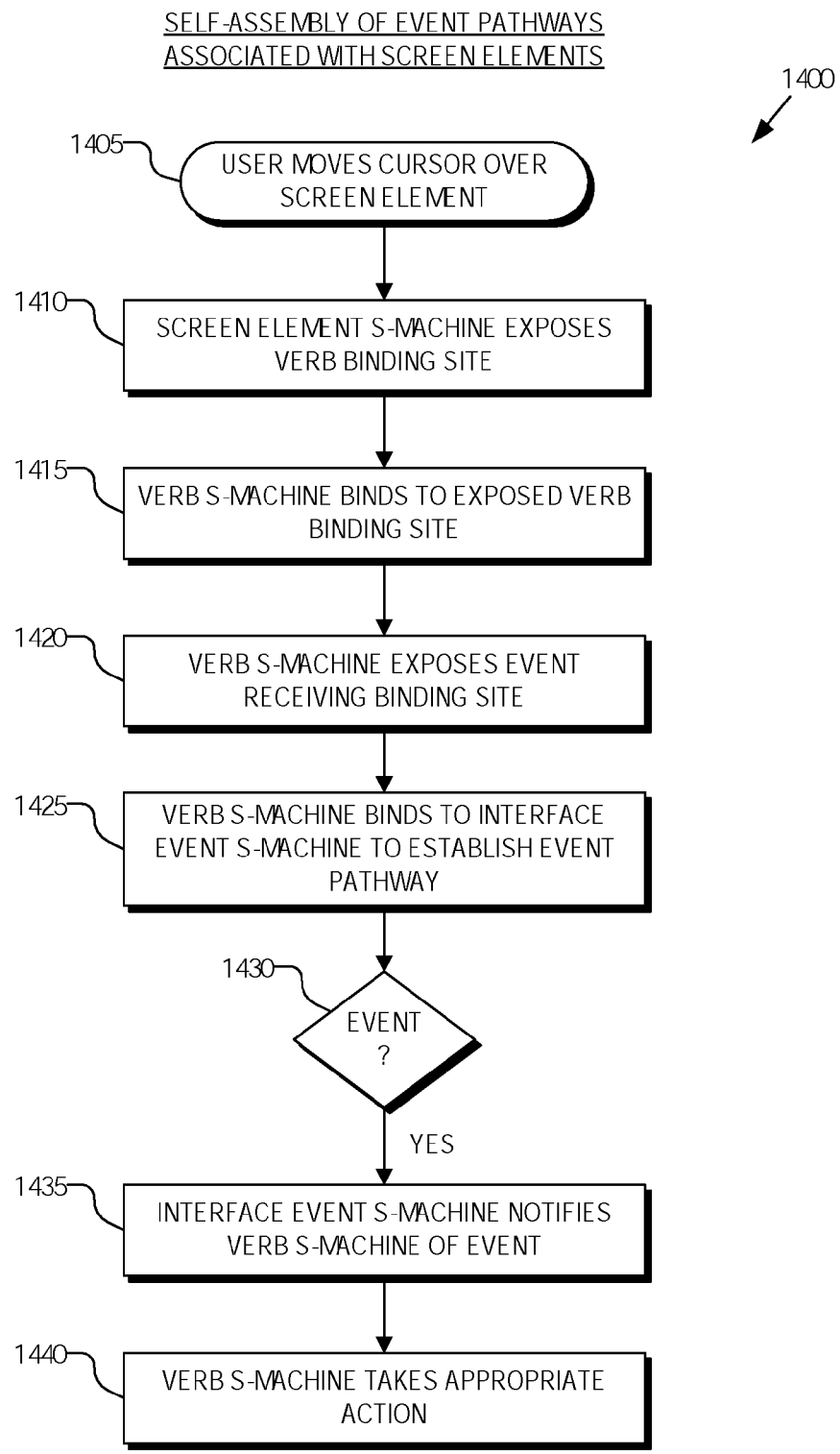
FIG. 14 is a flow chart illustrating a process to self-assemble event pathways associated with screen elements to implement various functionality associated with the screen elements, in accordance with an embodiment of the invention.

FIG. 14 is a flow chart illustrating a process 1400 to self-assemble event pathway 1300 associated with screen element (K) to implement various functionalities associated with screen element (K), in accordance with an embodiment of the invention. The order in which some or all of the process blocks appear in process 1400 should not be deemed limiting. Rather, one of ordinary skill in the art having the benefit of the present disclosure will understand that some of the process blocks may be executed in a variety of orders not illustrated, or even in parallel.

In a process block 1405, a user moves cursor 1250 over screen element (K). In a process block 1410, screen element s-machine (K) exposes one or more verb binding sites 1310 in response to cursor 1250. In one embodiment, screen element s-machine (K) exposes verb binding site 1310 in response to a signal issued by trigger s-machine 1110, and propagated by hierarchical grouping s-machines 1115, as to which screen element s-machine 1125 owns cursor 1250. Since in the illustrated embodiment of FIG. 12, cursor 1250 is residing over screen element (K), screen element s-machine (K) responds by exposing one or more verb binding sites 1310. Since the text area represented by screen element s-machine (K) can respond to left-mouse-click events (initiating text editing) and left-mouse-down-and-drag events (selecting text), screen element s-machine (K) will expose two verb binding sites 1310, with binding site keys complementary to the binding site keys 1340 of two different verb s-machines (A) and (B). Verb s-machine (A) embeds the functionality of responding to left-mouse-click events by initiating text editing. Verb s-machine (B) embeds the functionality of responding to left-mouse-down-and-drag events by selecting text.

In a process block 1415, verb s-machines 1305 (A) and (B) bind to exposed verb binding sites 1310 to create temporary bonds 1335 that last as long as the user maintains cursor 1250 over screen element (K). In a process block 1420, verb s-machines 1305 that are bound to screen element s-machine (K) expose an event receiving binding site 1315. Event receiving binding site 1315 is exposed in response to verb s-machine 1305 binding to screen element s-machine (K). The key of binding site 1315 of verb s-machine (A) is complementary to that of the binding site 1345 of interface event s-machine 1105 associated with left-mouse-click events. The key of binding site 1315 of verb s-machine (B) is complementary to that of the binding site 1350 of interface event s-machine 1105 associated with left-mouse-down-and-drag events. Upon exposing event receiving binding site 1315, verb s-machines (A) and (B) 1305 bind to interface event s-machine 1105 (process block 1425). At this point, one or more event pathways 1300 are established and ready to service events associated with screen element (K). In this example, two event pathways 1300 are established, one associated with left-mouse-click events and one associated with left-mouse-down-and-drag events.

Interface event s-machine 1105 may be constantly polling for a variety of different types of events, such as a left mouse click, left-mouse-down-and-drag, a key stroke, a scroll wheel action, a cursor navigation action, or otherwise. Interface event s-machine 1105 may have a binding site 1005 associated with each such event type, each with a different key. In a decision block 1430, if an event of a type associated with a bound binding site 1005 of interface event s-machine 1105 occurs, then the event is valid, and the process 1400 continues to a process block 1435. If an event occurs for which interface event s-machine 1105 has no bound event pathway, the event is invalid and no action is taken. Events can be categorized into event types based on a variety of factors including location of a cursor on a display screen, the current state of a computing environment (e.g., is a document/virtual book open, what application is currently being accessed, etc.), and whether the user input is a mouse click, a key stroke, a scroll wheel action, a cursor navigation, or otherwise.

Upon the occurrence of a valid event (decision block 1430), interface event s-machine 1105 sends a signal through the binding site 1005 associated with the event type. This signals the appropriate verb s-machine 1305 of the event occurrence along event pathway 1300 (process block 1435). Finally, in a process block 1440, the signaled verb s-machine 1305 takes the appropriate action in response to the specific event. For example, if the interface event was a left mouse click, verb s-machine (A) 1305 would be signaled, and respond by rendering a cursor in the x-y location of the screen pointer and putting the text in editing mode. It should be appreciated that embodiments of verb s-machines 1305 are not limited to binding to screen element s-machines 1125 for initiating text editing or selecting text, but rather may bind to a row rendering s-machines 1120 or hierarchical grouping s-machines 1115 to implement a variety of actions in response to a variety of events.

Returning to FIGS. 12 and 13, cursor 1250 is not currently residing over a screen element (J) 1225. Therefore, verb binding site 1320 of screen element s-machine (J) 1125 is internally hidden. Correspondingly, event receiving binding site 1325 of verb s-machine 1330 is also hidden, since verb s-machine 1330 is not currently bound to any screen element s-machine. For the sake of discussion, suppose screen element (J) 1225 corresponds to a button, and verb s-machine (C) 1330 responds to left-mouse-click events by displaying an image. If the cursor 1250 were moved over screen element (J) 1225, the bonds between interface event s-machine 1105, verb s-machines (A) and (B) 1305, and screen element s-machine (K) 1125 would all be broken, to be replaced by bonds between screen element s-machine (J) 1125, verb s-machine (C) 1330, and interface event s-machine 1105 in the same manner as described above. Since verb s-machine (C) 1330 responds to left-mouse-click events, it would bind to the very same binding site 1345 of interface event s-machine 1105 that had previously been bound to verb s-machine (A) 1305. Thus, many verb s-machines, all responding to the same event type, can bind, one at a time, to the same binding site on interface event s-machine 1105. Further, verb s-machines serve as a means of specializing the response to a generic interface event (such as left-mouse-click) to the context of the screen element s-machine to which it is bound. It should be appreciated that in other embodiments, the functionality of specializing the response to generic interface events may be embedded in the screen element s-machines 1125 themselves, rather than separate verb s-machines.

Figure 15:
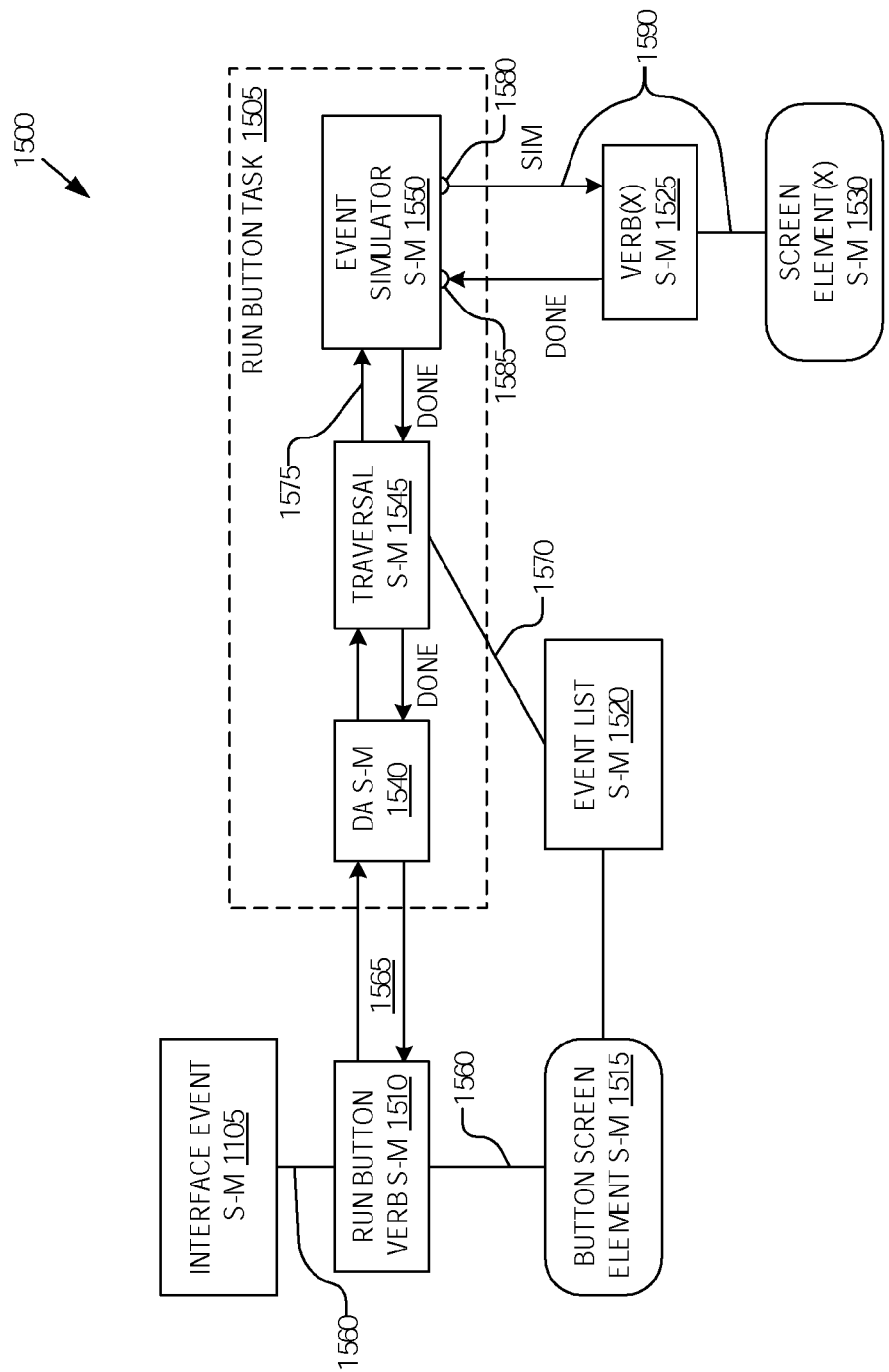
FIG. 15 is a block diagram illustrating pertinent s-machines assembled to implement a storyboard method of end-user programming, in accordance with an embodiment of the invention.

FIG. 15 is a block diagram illustrating an s-machine architecture 1500 for implementing the storyboard method of end-user programming described above, in accordance with an embodiment of the invention. The illustrated embodiment of architecture 1500 includes a run button task 1505, interface event s-machine 1105, a run button verb ("RBV") s-machine 1510, a button screen element s-machine 1515, an event list s-machine 1520, a verb(x) s-machine 1525, and a screen element(x) s-machine 1530. The illustrated embodiment of run button task 1505 includes a data access ("DA") s-machine 1540, a traversal s-machine 1545, and an event simulator s-machine 1550.

Upon clicking finish button 640 within button template 600, event list s-machine 1520 is created. Event list s-machine 1520 contains a listing of the events/actions copied from logbook 200 and information regarding each event/action including: the event/action type (e.g., left click, right click, typing, etc.), an identification of the particular verb and screen element s-machines involved in the event/action, and other additional details when pertinent (e.g., selection of input/output flags, what text was typed into button template 600, etc.). In addition, screen element s-machine 1515, corresponding to the new button screen element 905 is created, and self-assembles into render hierarchy 1100, so that the software button is rendered to the user interface. In one embodiment, the new software button may automatically be populated into the compass menu where the first action was taken. The end-user could also copy, paste, etc. the software button elsewhere. Anywhere the software button appears, the behavior will be the same to execute the button.

When the end-user runs software button 905, s-machines self-organize as illustrated in FIG. 15 to simulate or re-execute the sequence of user actions programmed into button template 600. In particular, when the user moves cursor 1250 over software button 905 corresponding to screen element s-machine 1515, a verb pathway (lines 1560) is self-assembled from screen element s-machine 1515 through RBV s-machine 1510 to interface event s-machine 1105, in the same manner as described above. Upon left clicking software button 905, RBV s-machine 1510 exposes sites (lines 1565) to link to DA s-machine 1540 of run button task 1505. RBV s-machine 1510 is handed event list s-machine 1520 from button screen element s-machine 1515. Button screen element s-machine 1515 is the screen element s-machine responsible for rendering software button 905. RBV s-machine 1510 passes event list s-machine 1520 to DA s-machine 1540 along with a start command to commence operation.

DA s-machine 1540 informs traversal s-machine 1545 about event list s-machine 1520. In response, traversal s-machine 1545 links to event list s-machine 1520 (line 1570). Traversal s-machine 1545 traverses the event list, handing each event/action to event simulator s-machine 1550, one event at a time, via link 1575. For each event/action, event simulator s-machine 1550 changes its binding keys 1580 and 1585 to bind to the appropriate verb (e.g., verb(x) s-machine 1525). Event simulator s-machine 1550 also causes the corresponding screen element(x) s-machine 1530 to bind to verb (x) s-machine 1525 forming a simulated verb pathway 1590. Event simulator s-machine 1550 then simulates the actions of interface event s-machine 1105 to trigger operation of verb(x) s-machine 1525. Upon completion, verb(x) s-machine 1525 signals "done" back to event simulator s-machine 1550 and event simulator s-machine 1550 signals "done" back to traversal s-machine 1545. In response, traversal s-machine 1545 retrieves the next event/action from event list s-machine 1520 and the process repeats until there are no more events. When all events/actions have been simulated, traversal s-machine 1545 signals "done" to DA s-machine 1540, which in turn signals "done" to run button verb s-machine 1510.

Figure 16:
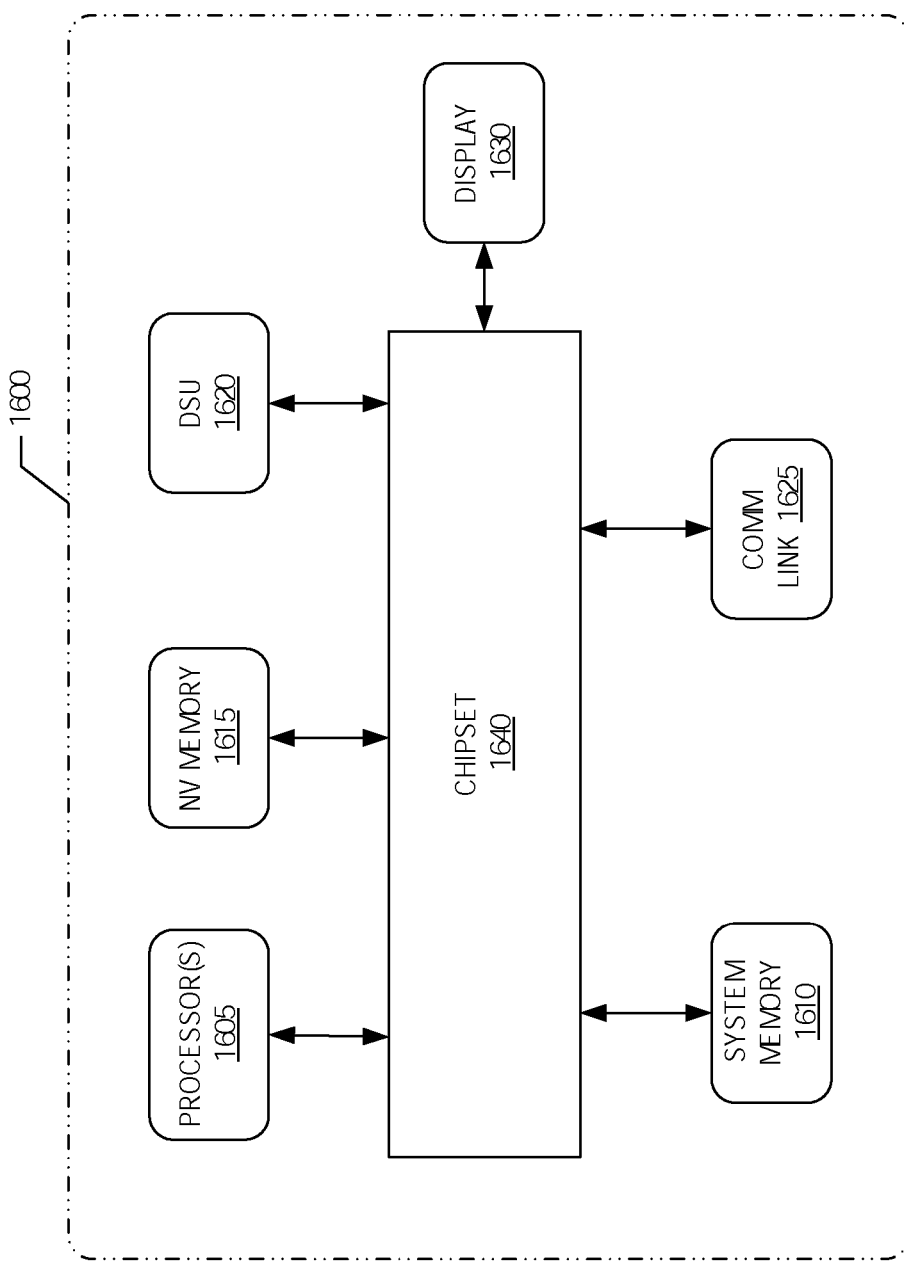
FIG. 16 is a block diagram illustrating a demonstrative processing system to execute embodiments of the invention thereon.

FIG. 16 is a block diagram illustrating a demonstrative processing system 1600 for executing embodiments of the invention described above. The illustrated embodiment of processing system 1600 includes one or more processors (or central processing units) 1605, system memory 1610, non-volatile ("NV") memory 1615, a data storage unit ("DSU") 1620, a communication link 1625, a display 1630, and a chipset 1640. The illustrated processing system 1600 may represent any computing system including a desktop computer, a notebook computer, a workstation, a handheld computer, a server, a blade, or the like.

The elements of processing system 1600 are interconnected as follows. Processor(s) 1605 is communicatively coupled to system memory 1610, NV memory 1615, DSU 1620, and communication link 1625, via chipset 1640 to send and to receive instructions or data thereto/therefrom. In one embodiment, NV memory 1615 is a flash memory device. In other embodiments, NV memory 1615 includes any one of read only memory ("ROM"), programmable ROM, erasable programmable ROM, electrically erasable programmable ROM, or the like. In one embodiment, system memory 1410 includes random access memory ("RAM"), such as dynamic RAM ("DRAM"), synchronous DRAM ("SDRAM"), double data rate SDRAM ("DDR SDRAM"), static RAM ("SRAM"), or the like. DSU 1620 represents any storage device for software data, applications, and/or operating systems, but will most typically be a nonvolatile storage device. DSU 1620 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1620 is illustrated as internal to processing system 1600, DSU 1620 may be externally coupled to processing system 1600. Communication link 1625 may couple processing system 1600 to a network such that processing system 1600 may communicate over the network with one or more other computers. Communication link 1625 may include a modem, an Ethernet card, a Gigabit Ethernet card, Universal Serial Bus ("USB") port, a wireless network interface card, a fiber optic interface, or the like. Display unit 1630 may be coupled to chipset 1640 via a graphics card and renders images for viewing by a user.

It should be appreciated that various other elements of processing system 1600 may have been excluded from FIG. 16 and this discussion for the purposes of clarity. Chipset 1640 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1640. Correspondingly, processing system 1600 may operate without one or more of the elements illustrated. For example, processing system 1600 need not include DSU 1620.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-readable medium includes any mechanism that provides (e.g., stores) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of end-user programming in a computing environment, comprising:
    populating a template with graphically illustrated actions;
    generating a storyboard within the template based on the graphically illustrated actions, the storyboard pictorially representing a sequence of user actions for interacting with the computing environment;
    invoking a command to generate a screen element for triggering execution of the sequence of user actions, wherein the sequence of user actions is based at least in part on the graphically illustrated actions populated into the template; and
    rendering the screen element within the computing environment.

2. The method of claim 1, further comprising storing the graphically illustrated actions within a virtual repository, wherein populating the template with the graphically illustrated actions comprises copying the graphically illustrated actions from the virtual repository into the template.

3. The method of claim 2, wherein each of the graphically illustrated actions comprises a thumbnail image depicting one or more user actions associated with the thumbnail image.

4. The method of claim 2, wherein the virtual repository comprises a virtual logbook within the computing environment, the method further comprising:
    logging user actions within the computing environment into the virtual logbook; and
    displaying a history of the user actions as the graphically illustrated actions within the virtual logbook.

5. The method of claim 4, further comprising:
    assigning a thumbnail image to the screen element;
    editing a thumbnail caption field within the template to edit a thumbnail caption; and
    displaying the thumbnail image and the thumbnail caption in the virtual logbook in response to triggering the screen element.

6. The method of claim 2, further comprising displaying natural language descriptions associated with each of the graphically illustrated actions upon populating the template with the graphically illustrated actions.

7. The method of claim 6, further comprising displaying a textual description describing the sequence of user actions within a screen element description field of the template, the textual description to be displayed as a natural language description of the sequence of user actions in a second template if the screen element is populated into the second template.

8. The method of claim 2, further comprising:
    setting input flags associated with first selected ones of the graphically illustrated actions populated into the template to designate whether the first selected ones of the graphically illustrated actions will prompt a user for user selectable input; and
    setting output flags associated with second selected ones of the graphically illustrated actions populated into the template to designate whether intermediate results from execution of the sequence of user actions will be output.

9. The method of claim 2, further comprising:
    editing a name field within the template to provide a textual name to be displayed on the screen element when rendered; and
    editing a hover text field within the template associated with hover text to be displayed when a cursor overlays the screen element.

10. The method of claim 2, wherein the screen element comprises a software button for triggering the sequence of user actions.

11. A machine-readable storage medium that provides instructions that, if executed by a machine, will cause the machine to perform operations comprising:
    providing a virtual repository of graphically illustrated actions;
    rendering a template for designing a screen element for display in a computing environment;
    enabling selected ones of the graphically illustrated actions to be copied from the virtual repository to the template;
    generating a storyboard within the template based on the graphically illustrated actions, the storyboard pictorially representing a sequence of user actions for interacting with the computing environment;
    generating the screen element, wherein the screen element is capable of executing the sequence of user actions upon invocation, wherein the sequence of user actions is determined based at least in part on the selected ones of the graphically illustrated actions copied into the template.

12. The machine-readable storage medium of claim 11, wherein the virtual repository comprises a virtual logbook, wherein the machine-readable storage medium further provides instructions that, if execute by the machine, will cause the machine to perform further operations, comprising:
    logging user actions into the virtual logbook in real-time; and
    displaying a history of the user actions as the graphically illustrated actions within the virtual logbook.

13. The machine-readable storage medium of claim 12, further providing instructions that, if executed by the machine, will cause the machine to perform further operations, comprising:
    enabling a thumbnail image to be assigned to the screen element;
    displaying an editable thumbnail caption field within the template for editing a thumbnail caption; and
    displaying the thumbnail image and the thumbnail caption in the virtual logbook in response to an invocation of the screen element.

14. The machine-readable storage medium of claim 11, further providing instructions that, if executed by the machine, will cause the machine to perform further operations, comprising:
    displaying natural language descriptions associated with each of the graphically illustrated actions when the graphically illustrated actions are copied into the template.

15. The machine-readable storage medium of claim 14, further providing instructions that, if executed by the machine, will cause the machine to perform further operations, comprising:
    displaying a textual description describing the sequence of user actions within a screen element description field of the template, the textual description to be displayed as a natural language description of the sequence of user actions in a second template if the screen element is copied into the second template.

16. The machine-readable storage medium of claim 11, further providing instructions that, if executed by the machine, will cause the machine to perform further operations, comprising:

enabling input flags associated with selected ones of the graphically illustrated actions copied into the template to be set to designate whether the selected ones of the graphically illustrated actions will prompt a user for user selectable input.

17. The machine-readable storage medium of claim 11, further providing instructions that, if executed by the machine, will cause the machine to perform further operations, comprising:

enabling output flags associated with selected ones of the graphically illustrated actions copied into the template to be set to designate whether intermediate results from execution of the sequence of user actions will be output.

18. The machine-readable storage medium of claim 11, further providing instructions that, if executed by the machine, will cause the machine to perform further operations, comprising:

displaying an editable name field within the template for typing a textual name to be displayed on the screen element; and displaying an editable hover text field within the template for typing hover text to be displayed when a cursor overlays the screen element.

19. The machine-readable storage medium of claim 11, wherein the screen element comprises a software button for invoking the sequence of user actions.

20. The machine-readable storage medium of claim 11, further providing instructions that, if executed by the machine, will cause the machine to perform further operations, comprising:

generating an event list associated with the screen element, the event list including an identification of events and event types performed during execution of the sequence of user actions;

traversing the event list in response to invocation of the screen element to identify the events to be performed; and simulating the sequence of user actions to automatically perform the events.

21. The machine-readable storage medium of claim 20, wherein the screen element is generated using software entities that self-organize during execution by linking binding sites having key values that correspond.

22. A system including at least one processor and a computer readable medium, the computer readable medium containing a data structure for execution by the at least one processor, the data structure comprising:

a virtual repository of graphically illustrated actions;

a template for designing a screen element for display in a computing environment;

means for copying selected ones of the graphically illustrated actions from the virtual repository to the template; and means for generating a storyboard within the template based on the graphically illustrated actions, the storyboard pictorially representing a sequence of user actions for interacting with the computing environment, wherein the screen element is capable of executing the sequence of user actions upon invocation, wherein the sequence of user actions is determined based at least in part on the selected ones of the graphically illustrated actions copied into the template.

23. The system of claim 22, wherein the virtual repository comprises a virtual logbook for logging user actions within the computing environment in real-time and for displaying a history of the user actions as the graphically illustrated actions.

24. The system of claim 22, wherein the template comprises a plurality of action fields for displaying the selected ones of the graphically illustrated actions as the storyboard representation of the sequence of user actions.

25. The system of claim 24, wherein the template comprises action description fields for automatically displaying textual descriptions for each of the user actions in response to copying the selected ones of the graphically illustrated actions into the template, wherein the textual descriptions read like a natural language description of the sequence of user actions.

26. The system of claim 25, wherein the template comprises:

input flag fields associated with input actions for designating whether the input actions will prompt a user for user selectable input upon invocation of the screen element; and output flag fields associated with output actions for designating whether the output actions will be displayed upon invocation of the screen element.

27. The system of claim 22, wherein the data structure further comprises:

an event list associated with the screen element, the event list including an identification of events and event types performed during execution of the sequence of user actions;

a traversal entity for linking to the event list and traversing the event list to identify the events to be performed; and an event simulator for linking to the traversal entity and simulating the events identified by the traversal entity to execute the sequence of user actions.

* * * * *